(12) United States Patent
Boucard

(10) Patent No.: US 11,383,396 B2
(45) Date of Patent: Jul. 12, 2022

(54) INTERACTIVE LABORATORY ROBOTIC SYSTEM

(71) Applicant: Tesseract Ventures, LLC, Overland Park, KS (US)

(72) Inventor: John Boucard, Overland Park, KS (US)

(73) Assignee: Tesseract Ventures, LLC, Overland Park, KS (US)

( * ) Notice: Subject to any disclaimer, the term of this patent is extended or adjusted under 35 U.S.C. 154(b) by 261 days.

(21) Appl. No.: 15/488,138

(22) Filed: Apr. 14, 2017

(65) Prior Publication Data

US 2017/0217027 A1  Aug. 3, 2017

Related U.S. Application Data

(63) Continuation of application No. PCT/US2015/055965, filed on Oct. 16, 2015.
(Continued)

(51) Int. Cl.
*B25J 15/06* (2006.01)
*B25J 19/02* (2006.01)
(Continued)

(52) U.S. Cl.
CPC ........... *B25J 19/023* (2013.01); *B01L 3/5085* (2013.01); *B01L 9/523* (2013.01); *B25J 5/007* (2013.01);
(Continued)

(58) Field of Classification Search
CPC ...... B25J 13/08; B25J 15/022; B25J 15/0608; B25J 19/005; B25J 19/023; B25J 5/007; B25J 9/0087; B01L 2200/025; B01L 2300/021; B01L 2300/022; B01L 2300/0829; B01L 3/5085; B01L 9/523;
(Continued)

(56) References Cited

U.S. PATENT DOCUMENTS 5,366,896 A * 11/1994 Margrey ................ G16H 40/63
436/48
2004/0086368 A1    5/2004 Downs et al.
(Continued)

OTHER PUBLICATIONS

International Search Report and Written Opinion for PCT/US2015/055965 dated Feb. 8, 2016.

*Primary Examiner* — Robert T Nguyen
(74) *Attorney, Agent, or Firm* — Polsinelli PC

(57) ABSTRACT

An interactive laboratory robotic system is described that includes devices for use in a laboratory including a robotic assistant that can perform tasks and that can be controlled and configured by humans. The robot may assist personnel in performing repetitive tasks within a laboratory, and capture and store transactional and analytical data, such as during a DNA sequencing process. The robot may include sensors and/or cameras to detect, recognize, and track objects in an environment, and a manipulable arm having a hand for grasping objects. Other components of the system may include a sample tray graspable by the robot; a tray carriage for holding sample trays within equipment; an interactive shelf for holding sample trays; a mobile cart for mating with and charging the robot; and an accessory unit to enable the robot to open doors of equipment. The system may help to reduce or eliminate mistakes by personnel.

21 Claims, 21 Drawing Sheets

Related U.S. Application Data

(60) Provisional application No. 62/065,491, filed on Oct. 17, 2014.

(51) Int. Cl.

| | | |
|---|---|---|
| *B01L 3/00* | (2006.01) | |
| *B01L 9/00* | (2006.01) | |
| *B25J 13/08* | (2006.01) | |
| *B25J 15/02* | (2006.01) | |
| *B25J 19/00* | (2006.01) | |
| *B25J 5/00* | (2006.01) | |
| *G01N 35/00* | (2006.01) | |
| *B25J 9/00* | (2006.01) | |
| *B62B 1/06* | (2006.01) | |
| *B62B 3/04* | (2006.01) | |
| *G01N 35/04* | (2006.01) | |

(52) U.S. Cl.
CPC ............ *B25J 9/0087* (2013.01); *B25J 13/08* (2013.01); *B25J 15/022* (2013.01); *B25J 15/0608* (2013.01); *B25J 19/005* (2013.01); *B62B 1/06* (2013.01); *B62B 3/04* (2013.01); *G01N 35/0099* (2013.01); *G01N 35/04* (2013.01); *B01L 2200/025* (2013.01); *B01L 2300/021* (2013.01); *B01L 2300/022* (2013.01); *B01L 2300/0829* (2013.01); *G01N 2035/0493* (2013.01); *Y10S 901/01* (2013.01)

(58) Field of Classification Search
CPC ........ B62B 1/06; B62B 3/04; G01N 35/0099; G01N 35/04; G01N 2035/0493; Y10S 901/01
See application file for complete search history.

(56) References Cited

U.S. PATENT DOCUMENTS

| | | | |
|---|---|---|---|
| 2004/0236463 A1* | 11/2004 | Weselak | G11B 15/6835 700/214 |
| 2005/0184697 A1* | 8/2005 | Iribe | B25J 9/1633 318/568.12 |
| 2006/0041787 A1 | 2/2006 | Knoedgen et al. | |
| 2006/0106495 A1* | 5/2006 | Takenaka | B62D 57/032 700/253 |
| 2006/0247825 A1* | 11/2006 | Omote | H04W 24/00 704/E13.008 |
| 2008/0044261 A1 | 2/2008 | Neeper et al. | |
| 2008/0272138 A1 | 11/2008 | Ross et al. | |
| 2010/0030381 A1* | 2/2010 | Clifford | B05B 13/0452 901/49 |
| 2011/0178636 A1* | 7/2011 | Kwon | B62D 57/032 901/1 |
| 2012/0059518 A1* | 3/2012 | Lee | B62D 57/032 901/1 |
| 2012/0143376 A1* | 6/2012 | Seo | B25J 9/104 901/1 |
| 2012/0158181 A1* | 6/2012 | Seo | B62D 57/032 901/16 |
| 2012/0158182 A1* | 6/2012 | Lee | B25J 9/162 901/16 |
| 2012/0158183 A1* | 6/2012 | Lim | B25J 9/162 700/261 |
| 2012/0310412 A1* | 12/2012 | Seo | G06N 3/008 700/254 |
| 2012/0316682 A1* | 12/2012 | Seo | B62D 57/032 901/1 |
| 2012/0316683 A1* | 12/2012 | Seo | B62D 57/032 901/1 |
| 2013/0034660 A1* | 2/2013 | Koyanagi | B05B 13/0452 118/620 |
| 2013/0158712 A1* | 6/2013 | Lee | G05B 19/04 901/1 |
| 2013/0204436 A1* | 8/2013 | Kim | B25J 9/16 901/47 |
| 2013/0345863 A1 | 12/2013 | Linder et al. | |
| 2014/0225491 A1* | 8/2014 | Shoenfeld | A47B 81/00 312/237 |
| 2014/0251702 A1* | 9/2014 | Berger | B25J 5/007 180/21 |
| 2014/0305227 A1* | 10/2014 | Johns | B01D 21/262 73/863.01 |
| 2015/0210174 A1* | 7/2015 | Settele | B25J 13/085 320/109 |
| 2018/0111270 A1* | 4/2018 | Hasegawa | B25J 9/1682 |
| 2021/0321827 A1* | 10/2021 | Zarcone | A47J 43/06 |

* cited by examiner

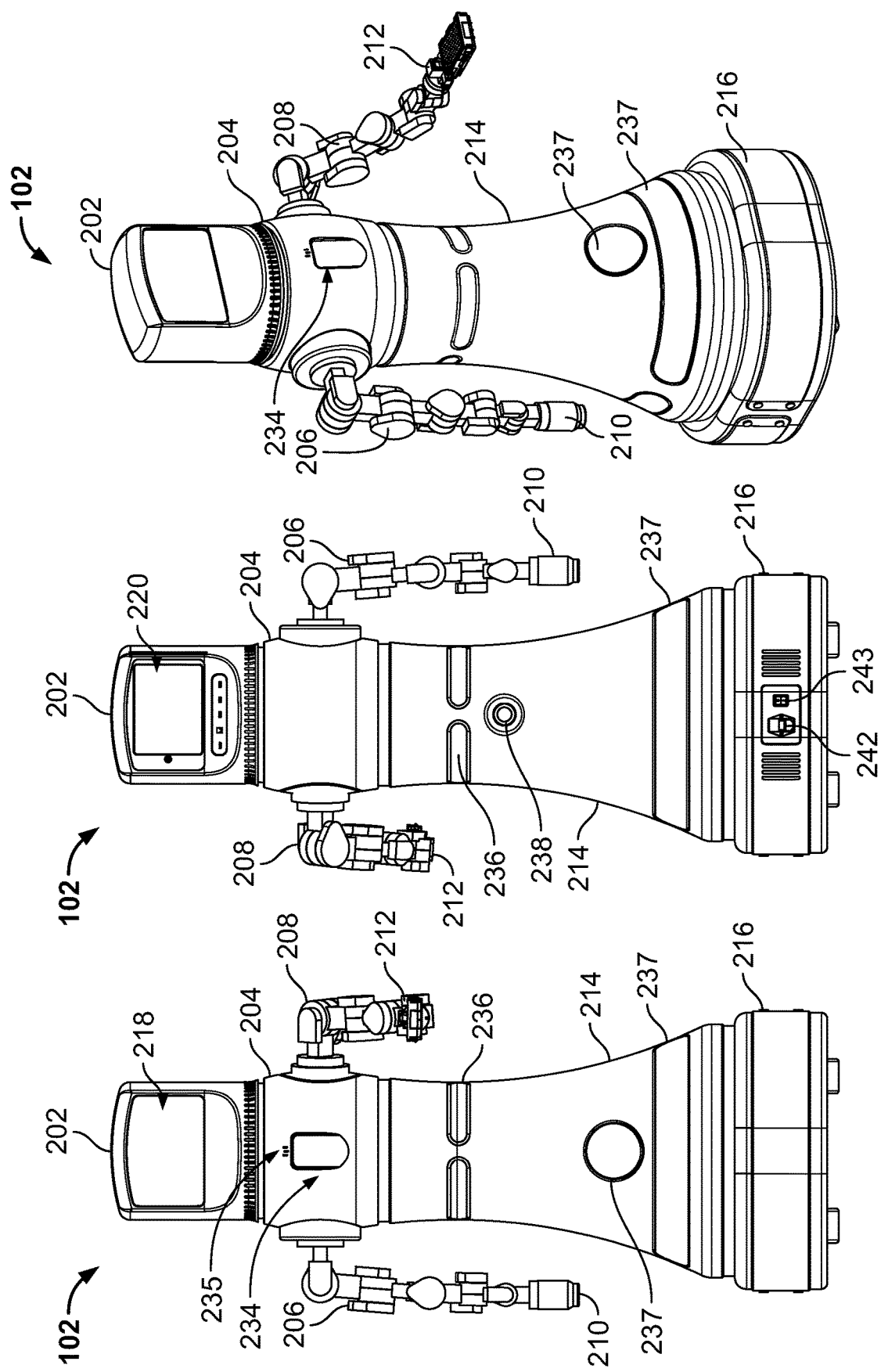

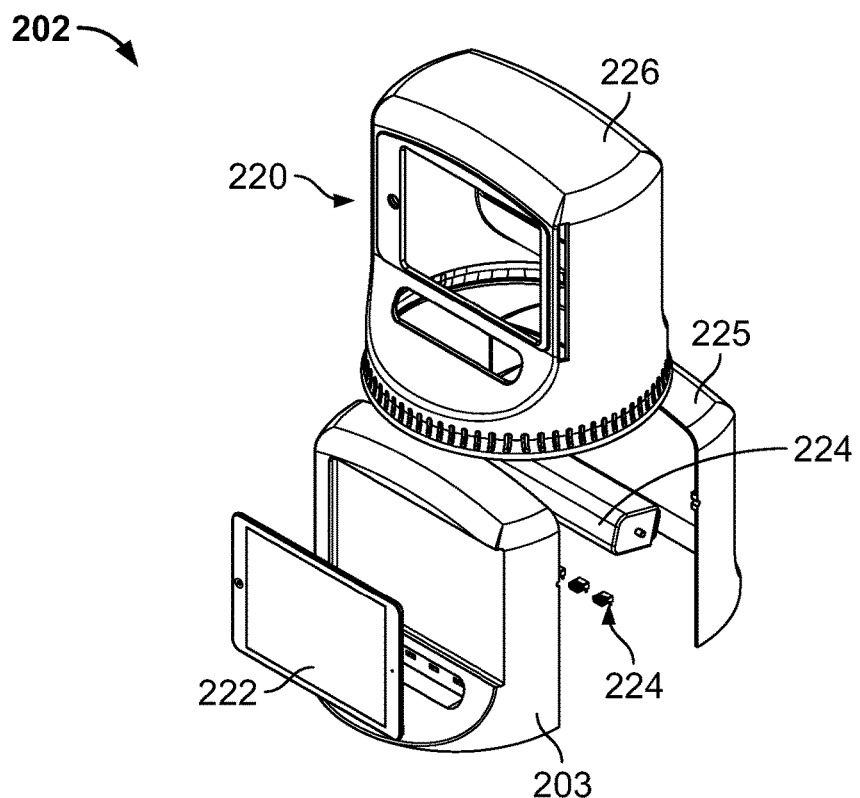
FIG. 12
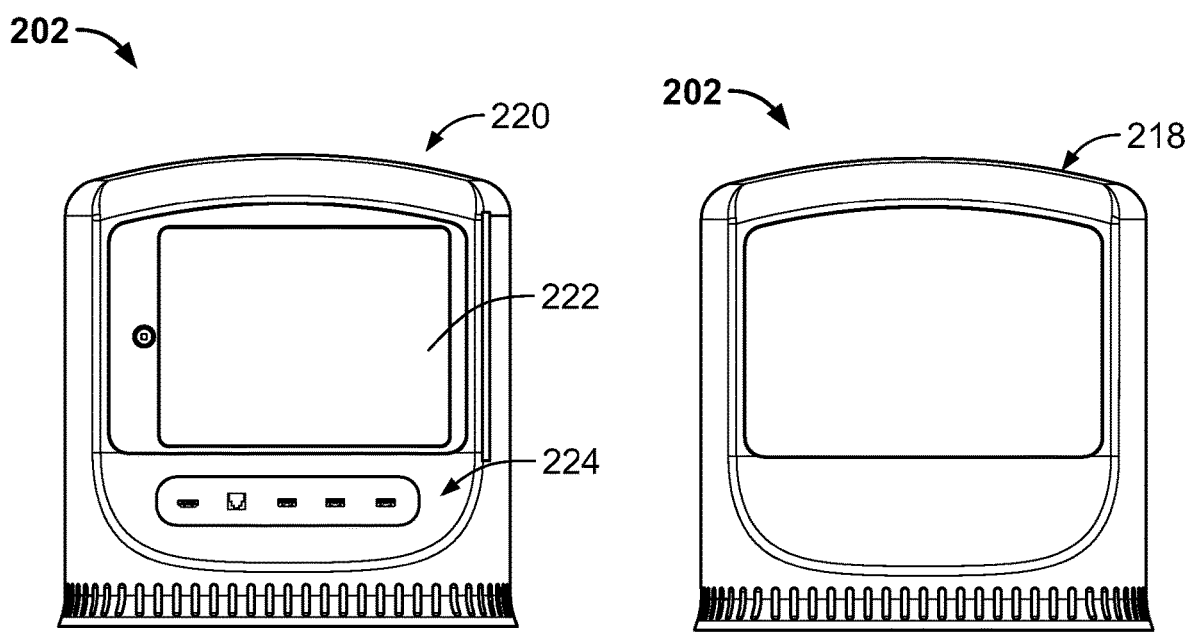
FIG. 13  FIG. 14

INTERACTIVE LABORATORY ROBOTIC SYSTEM

CROSS-REFERENCE TO RELATED APPLICATIONS

This application is a continuation of International Application No. PCT/US2015/055965, filed on Oct. 16, 2015, which claims the benefit of U.S. Provisional Patent Application No. 62/065,491, filed Oct. 17, 2014. The contents of both applications are fully incorporated herein by reference.

TECHNICAL FIELD

This disclosure generally relates to an interactive laboratory robotic system, and more particularly, to a system of devices for use in a laboratory environment including a robotic assistant that can perform tasks and that can be controlled and configured by humans.

BACKGROUND

Scientific and technological research and experiments are typically performed in laboratories. Laboratories often include workstations for personnel and various pieces of equipment for performing the research and experiments. One particular type of laboratory is a DNA sequencing laboratory that processes biological samples for DNA sequencing. The equipment in a DNA sequencing laboratory can include DNA sequencers, dispensers, PCR (polymerase chain reaction) instruments, refrigeration units, transport carts, sample trays, and other types of equipment. DNA sequencing can be utilized to determine the unique sequence of nucleotides within a DNA molecule. Each cell in a living organism has DNA molecules that contain the genetic code for the organism to develop, live, and reproduce. The genetic code is determined by the specific sequence of nucleotides that make up a DNA molecule. Researchers and scientists can use DNA sequencing for a multitude of uses, such as studying the genomes of organisms, identifying particular genes, identifying specific organisms, and studying how different organisms are related.

In a typical DNA sequencing laboratory, human personnel can manually perform many of the various tasks needed for processing biological samples for DNA sequencing. Such tasks may include preparation of the biological samples, insertion and removal of samples into and from dispensers, DNA sequencers, PCR instruments, refrigeration units, and other equipment, transportation of samples between workstations and pieces of equipment, transporting samples between pieces of equipment, and recording data associated with the samples. The preparation of the samples may include, for example, DNA extraction and purification, DNA amplification and purification, and/or sequencing reaction.

However, there are drawbacks to having personnel manually perform these DNA sequencing tasks. For example, personnel can make mistakes due to inexperience, fatigue, and other factors. Such mistakes, such as placing the wrong samples in the equipment, incorrectly storing samples, and incorrectly recording data, could contaminate the samples and/or affect the results of the DNA sequencing. As another example, personnel performing these repetitive DNA sequencing tasks may be better utilized doing other tasks that are more suited to their background and experience.

Therefore, there exists an opportunity for an improved system that can assist personnel to perform certain repetitive tasks in a laboratory environment, in order to, among other things, obtain improved and optimized processing of samples and capture of more accurate data during scientific research.

SUMMARY

The invention is intended to solve the above-noted problems by providing systems for assisting personnel to perform certain repetitive tasks in a laboratory environment, such as during a DNA sequencing process. The systems are designed to include one or more of the following, among other things: (1) a robot having sensors to detect, recognize, and track objects in an environment; a drive train for moving the robot to locations in the environment; at least one manipulable arm having a hand for grasping objects; a rechargeable power source; and an interactive control interface for allowing configuration and control of the robot; (2) a sample tray for holding samples and adapted to be grasped by the hand of the robot, and having identifying devices readable by a sensor of the robot for uniquely identifying the sample tray; (3) a tray carriage adapted to be used in a laboratory analysis tool for holding the sample tray during operation of the laboratory analysis tool; (4) an interactive shelf having receiving slots for holding the sample tray where each of the receiving slots has a unique identifier readable by one or more sensors of the robot for determining whether a receiving slot is empty or full; (5) a mobile cart adapted to hold the interactive shelf, mate with the robot, and move with the robot, and having a power source for charging the robot power source, and a power connection for charging the power source; (6) a refrigeration unit adapted to hold the interactive shelf; and (7) an accessory unit adapted to be attached to a door of the laboratory analysis tool and the refrigeration unit, and having a hinge to allow a hand of the robot to engage with the accessory unit to open the door, an equipment identifying device readable by a sensor of the robot for uniquely identifying the laboratory analysis tool and the refrigeration unit, and an optical sensor for assisting the hand of the robot to engage with the accessory unit.

The systems enable improved and optimized processing of samples and the capture of more accurate data during scientific research, such as the DNA sequencing process. In particular, certain repetitive tasks can be completed by the robot in conjunction with the other components of the system, such as inserting and removing samples into and from dispensers, DNA sequencers, PCR instruments, refrigeration units, and other equipment, transporting samples between workstations and pieces of equipment, transporting samples between pieces of equipment, and automatically recording data associated with the samples. In this way, mistakes by inexperienced or fatigued personnel can be reduced or eliminated so that the research process is more efficient and personnel can be utilized more effectively.

These and other embodiments, and various permutations and aspects, will become apparent and be more fully understood from the following detailed description and accompanying drawings, which set forth illustrative embodiments that are indicative of the various ways in which the principles of the invention may be employed.

BRIEF DESCRIPTION OF THE DRAWINGS

FIGS. 2-4 are elevational and perspective views of an exemplary embodiment of a robot of the interactive laboratory robotic system.

FIGS. 12-14 are exploded perspective and elevational views of a head of the robot of the interactive laboratory robotic system.

DETAILED DESCRIPTION OF THE INVENTION

Figure 1:
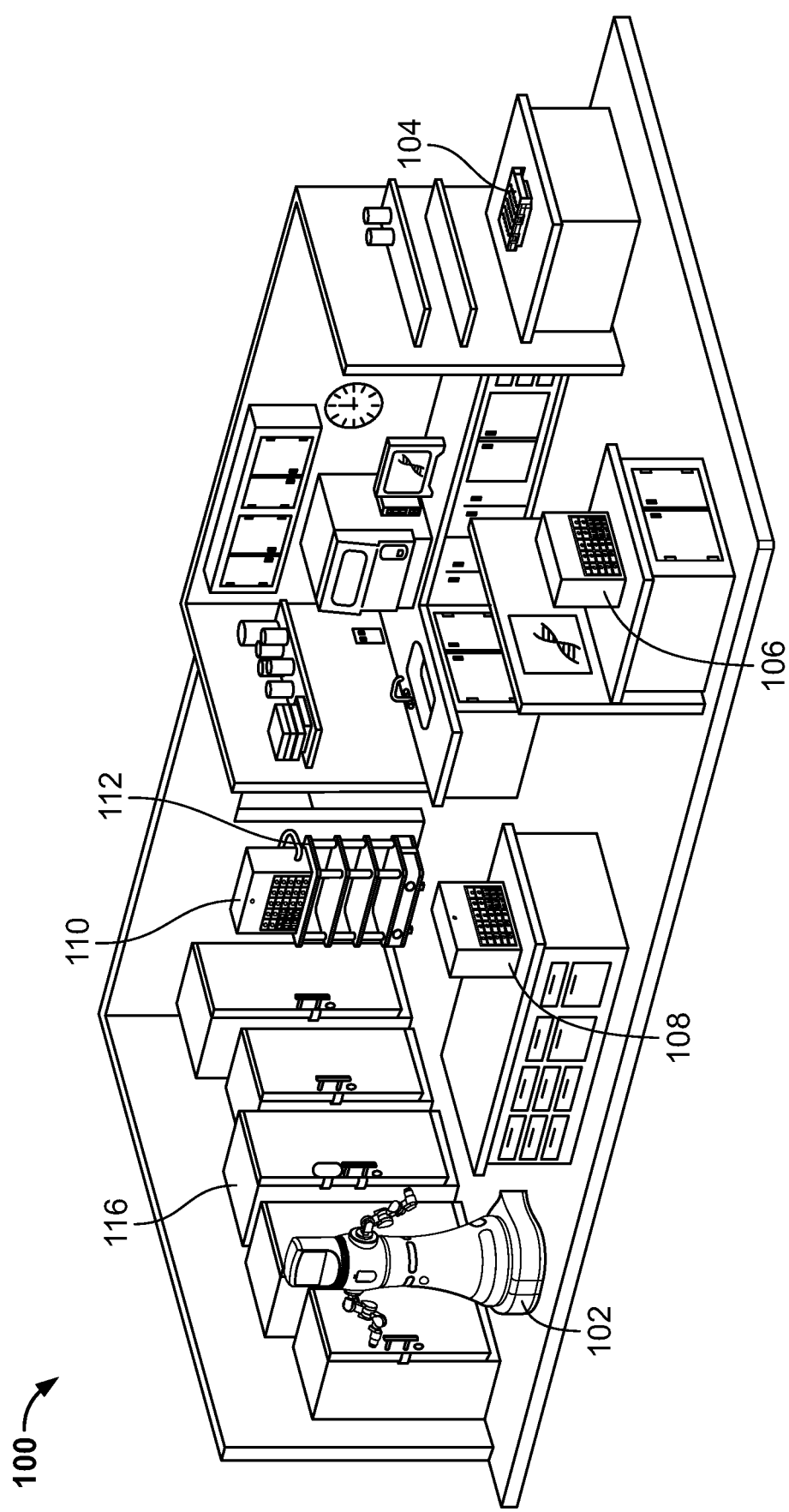
FIG. 1 is a depiction of an exemplary laboratory environment including an interactive laboratory robotic system.

The description that follows describes, illustrates and exemplifies one or more embodiments in accordance with their principles. This description is not provided to limit the embodiments described herein, but rather to explain and teach the principles of the embodiments in such a way to enable one of ordinary skill in the art to understand these principles and, with that understanding, be able to apply them to practice not only the embodiments described herein, but also other embodiments that may come to mind in accordance with these principles. The scope of the embodiments is/are intended to cover all such embodiments that may fall within the scope of the appended claims, either literally or under the doctrine of equivalents.

It should be noted that, in the description and drawings, like or substantially similar elements may be labeled with the same reference numerals. However, sometimes these elements may be labeled with differing numbers such as, for example, in cases where such labeling facilitates the didactic purpose of the specification. Additionally, the drawings set forth herein are not necessarily drawn to scale, and in some instances, proportions may have been exaggerated to more clearly depict certain features. Such labeling and drawing practices do not necessarily implicate an underlying substantive purpose. As stated above, the present specification is intended to be taken as a whole and interpreted in accordance with the principles of the embodiments as taught herein and understood to one of ordinary skill in the art.

With respect to the exemplary systems, components and architecture described and illustrated herein, it should also be understood that the embodiments may be embodied by, or employed in, numerous configurations and components, including one or more systems, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system.

FIG. 1 illustrates an exemplary environment 100 in which the interactive laboratory robotic system described herein can be implemented. The environment 100 of FIG. 1 depicts a DNA sequencing laboratory facility. It will be understood that the depicted environment 100 is merely exemplary and the interactive laboratory robotic system described herein could be used in many other types of environments. The interactive laboratory robotic system can include a robot 102 capable of interacting with the environment 100, such as moving to locations within the environment 100 and interacting with components of the interactive laboratory robotic system, including a sample tray 104, shelves 106, 108, 110, mobile cart 112, DNA sequencer 114, and refrigeration unit 116. Each of the components of the interactive laboratory robotic system can be utilized by human personnel and/or the robot 102 to process biological samples for DNA sequencing.

Generally, personnel are involved with the initial preparation of samples for DNA sequencing, such as DNA extraction and purification by personnel and/or automated dispensers, DNA amplification and purification by personnel with a PCR instrument, and/or sequencing reaction by personnel and/or automated dispensers. The robot 102 can assist personnel to perform repetitive tasks within the environment 100 during the DNA sequencing process, such as inserting and removing the sample tray 104 into and from shelves 106, 108, 110, DNA sequencer 114, refrigeration unit 116, and/or other equipment, e.g., automated dispensers and PCR instruments (not shown). For example, after DNA extraction and purification of the biological samples has been performed, the robot 102 can retrieve and insert the sample tray 104 into the shelves 106, 108, 110, into the refrigeration unit 116, into the PCR instrument, and/or onto a workstation. As another example, after DNA amplification and purification has been performed, the robot 102 can retrieve and insert the sample tray 104 into the shelves 106, 108, 110, into the refrigeration unit 116, onto a workstation, and/or into the DNA sequencer 114.

The robot 102 can be configured to move autonomously to locations within the environment 100, such as to waypoints in the environment 100 and/or to the various components of the interactive laboratory robotic system. For example, waypoints can be assigned to the locations of the components of the interactive laboratory robotic system so that the robot 102 can travel to the components to perform tasks, as needed. In embodiments, the robot 102 can automatically return to a predetermined location, e.g., mobile cart 112, to recharge its power source when necessary.

Front, rear, and perspective views of the robot 102 are shown in FIGS. 2-4. In particular, the robot 102 can include a head 202, a turret 204, one or more arms 206, 208 with hands 210, 212, a body 214, and a base 216. As described below, the components of the robot 102 can have a modular construction for ease of assembly, maintenance, and repair. Such a modular construction can enable components of the robot 102 to be swapped as needed to adapt to different laboratory environments. In addition, the components of the robot 102 may be uniquely identifiable and trackable to measure usage, wear and tear, etc. of the components. In some embodiments, data related to the components of the robot 102 may be analyzed for determining optimal combinations of the components for particular usages and/or environments. The various components of the robot 102 can be constructed from any suitable material and be assembled in any suitable way.

The head 202 is independently rotatable on the turret 204, and is shown in more detail in FIGS. 12-14. An array of sensors and/or cameras can be included on one side 218 of the head 202 so that the robot 102 can detect, recognize, and track objects in an environment. The side 218 of the head 202 can have a transparent or translucent window 225 so that the array of sensors and/or cameras included within the head 202 can sense and/or view the environment. The array of sensors and/or cameras can include, for example, two dimensional cameras, three dimensional cameras, two dimensional lasers, three dimensional lasers, ultrasonic emitters, infrared emitters, infrared detectors, light-based navigation systems, moving proximity and dimensional sensors, sensors to read floor patterns, and/or other type of sensors and cameras. The array of sensors and/or cameras can be adapted to track objects and colors, determine proximity, bearing, position, and map two and three dimensional environments, and scan visual codes and QR codes, for example.

The other side 220 of head 202 can include components of an interactive control interface, such as a tablet interface 222 and I/O ports 224, e.g., USB, HDMI, Ethernet, etc. Personnel can interact with the tablet interface 222 and I/O ports 224 to control and configure the robot 102. For example, the tablet interface 222 may have a graphical user interface (e.g., character or emotional) that can display and/or announce statuses of the robot 102, data related to the biological samples being processed and/or stored, allow configuration of the robot 102, and/or have other functions. Personnel can interact with the tablet interface 222 through touch, speech, unique identifiers, mobile applications, secondary accessories or equipment, and/or portable storage devices, for example. The I/O ports 224 can be used to configure routines and tasks; upgrade software and firmware; execute, cancel, intelligently modify, manage, and manipulate data; upload and download data, video, etc. to and from the robot 102; and/or be used for other functions. In some embodiments, data can be communicated to and from the robot 102 through a wireless networking connection, e.g., Wi-Fi, Bluetooth, ZigBee, optical, cellular, etc. As best shown in FIG. 12, the head 202 can be constructed of several components, such as a receptacle 223 for the tablet interface 222 on side 220, a window 225 on side 218 for the array of sensors and/or cameras, and a cover 226 to contain the components of the head 202.

Figure 10:
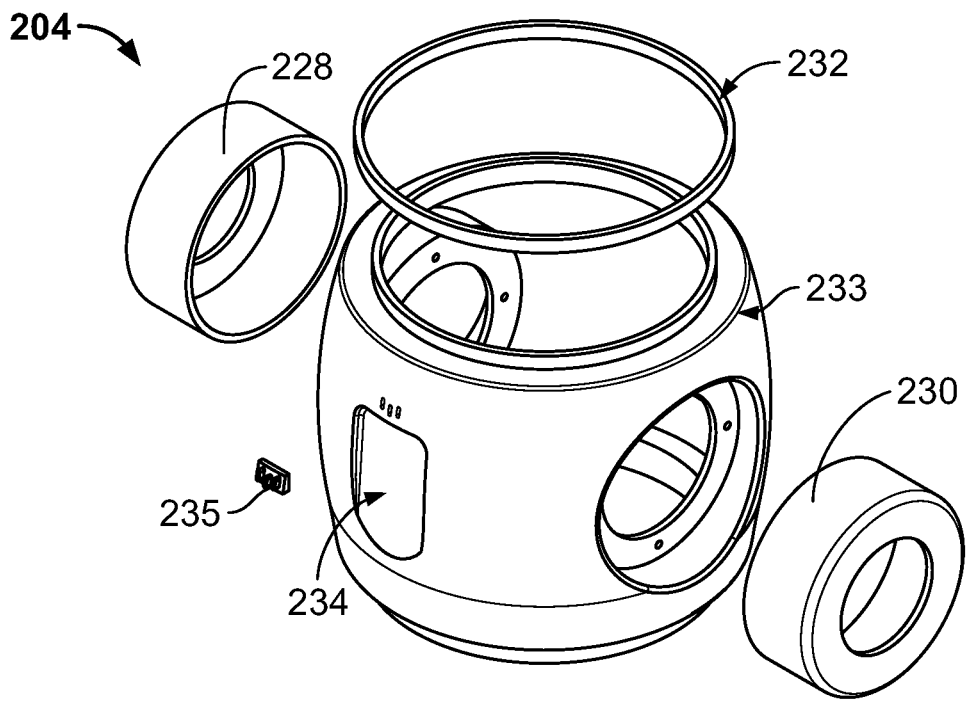
FIGS. 10-11 are exploded perspective views of a turret of the robot of the interactive laboratory robotic system.
Figure 11:
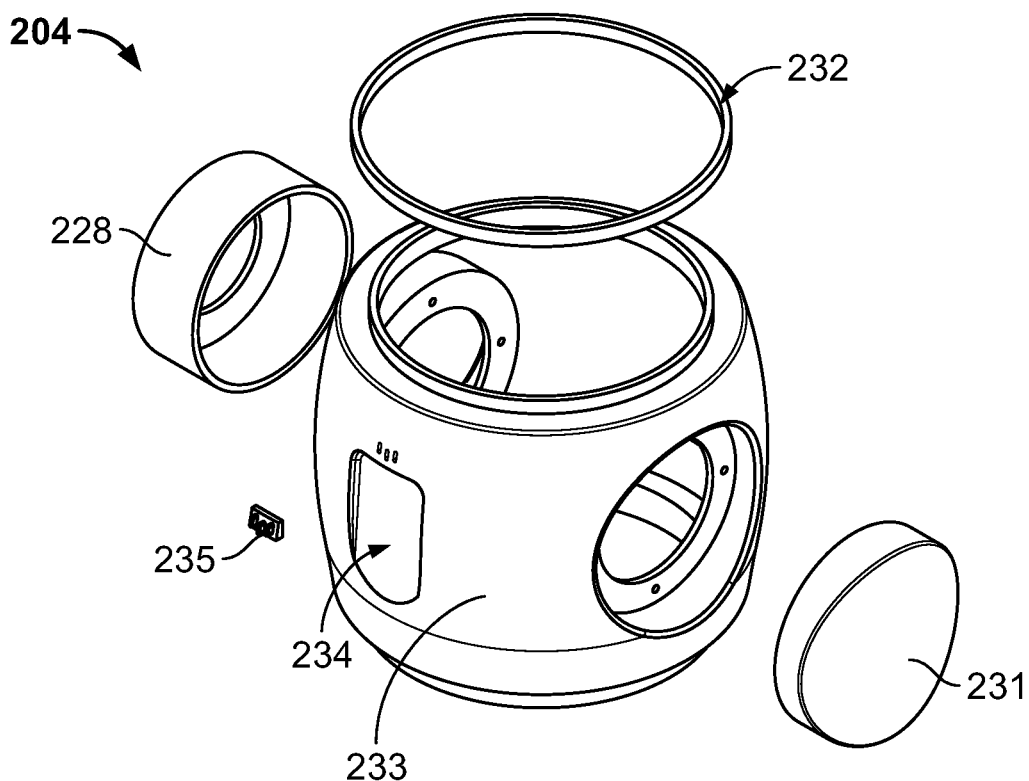

The turret 204 is independently rotatable between the head 202 and the body 214, and is shown in more detail in FIGS. 10-11. The turret 204 can include mechanical interfaces to allow attachment of the turret 204 to the head 202 and to arms 206, 208. In particular, a sleeve 232 can sit atop the turret 204 to allow attachment of the rotatable head 202. Sleeves 228, 230 can be used to attach arms 206, 208 to the turret 204. In some embodiments, a single arm can be attached to turret 204 and a sleeve cover 231 can cover the hole in the turret 204 that would be used for another arm. The arms 206, 208 may be articulated and have various degrees of freedom. Due to the degrees of freedom of the arms 206, 208 and the rotatability of the turret 204, the hands 210, 212 are able to access any point in the area around the robot 102. The arms 206, 208 and hands 210, 212 are described in more detail below.

An interface 234 and/or a unique identification reader 235 on the turret 204 can enable personnel to interact with the robot 102 for configuration and control purposes. For example, personnel can use smartcards embedded with RFID chips, microchips, and/or other unique identifiers to train the robot 102 to perform particular planned and/or recommended routines and various tasks, such as moving to a location within the environment or picking up and storing a sample tray 104. Using such unique identifiers can allow personnel without sophisticated programming knowledge to more easily train the robot 102 or augment routines to enable the robot 102 to be used in various environments. Smartcards can also be used to identify particular personnel, so that only authorized personnel are able to configure and control the robot 102. For example, the different security credentials of personnel may determine the allowable level of configuration over the robot 102. In some embodiments, the robot 102 can be trained using a mimic and follow technique, as is known in the art, in addition to or in lieu of configuring the robot 102 with smartcards.

Figure 9:
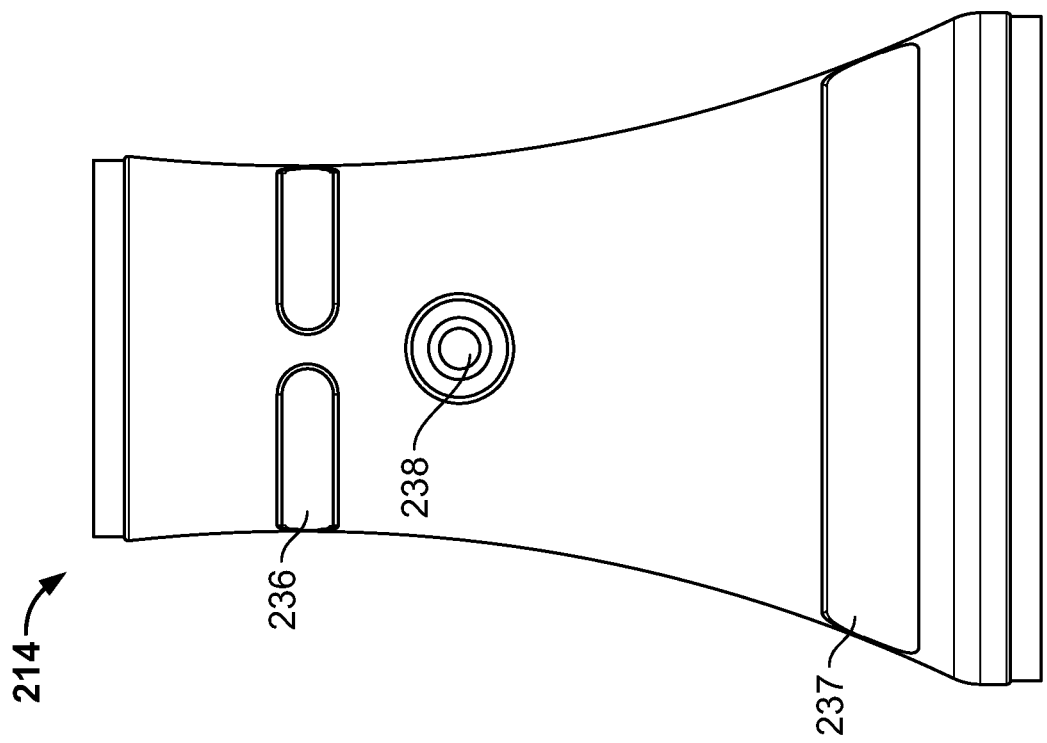
FIGS. 8-9 are elevational views of a body of the robot of the interactive laboratory robotic system.
Figure 8:
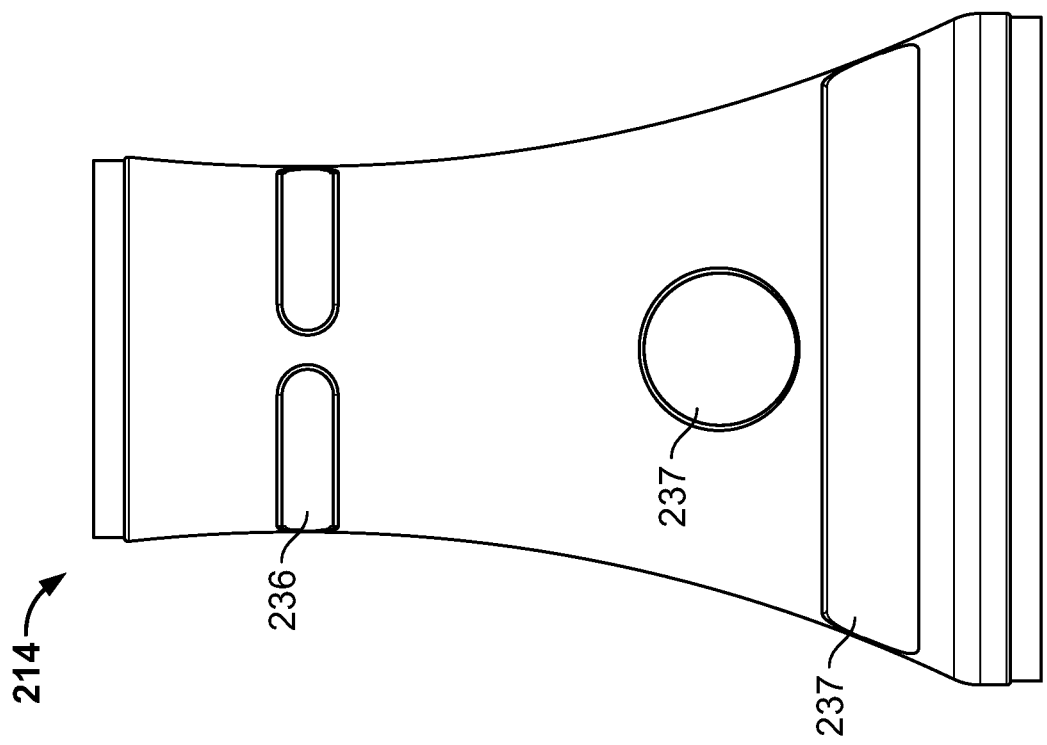

The body 214 of the robot 102 can be situated below the turret 204 and upon a base 216, and is shown in more detail in FIGS. 8-9. The body 214 can include suitable mechanical interfaces to allow attachment of the body 214 to the turret 204 and base 216. The body 214 can include one or more mood lights 236 that can quickly indicate to personnel the status of the robot 102. For example, the mood lights 236 can be green when the robot 102 is operating normally with sufficient power, yellow when the robot 102 is low on power, and red when the robot 102 needs to be charged and/or is malfunctioning. In some embodiments, the mood lights 236 can also flash in particular patterns and/or be synchronized with audio messaging to convey the status of the robot 102 (e.g., each routine can have a particular flashing pattern), to show reactions of the robot 102 to input from personnel, and/or for other purposes. In other embodiments, the mood lights 236 can have particular flashing and/or animation to optically communicate with other devices.

One or more transparent or translucent sensor windows 237 can be included on the body 214 so that sensors and/or cameras within the robot 102 can sense and view the environment. For example, the sensors and/or cameras on in the body 214 can be used to detect objects in the environment during movement of the robot 102. In some embodiments, the sensor windows 237 may be easily swappable with optically adjustable inserts, e.g., concave or convex lenses to enhance the range of the sensors and/or cameras. An emergency shutoff switch 238 may also be included on the body 214 so that the robot 102 can be immediately deactivated by personnel, if necessary, such as in the case of malfunction. Various internal components of the robot 102 can be housed within the body 214 upon the base 216, as shown in FIG. 7 and described in more detail below.

Figure 5:
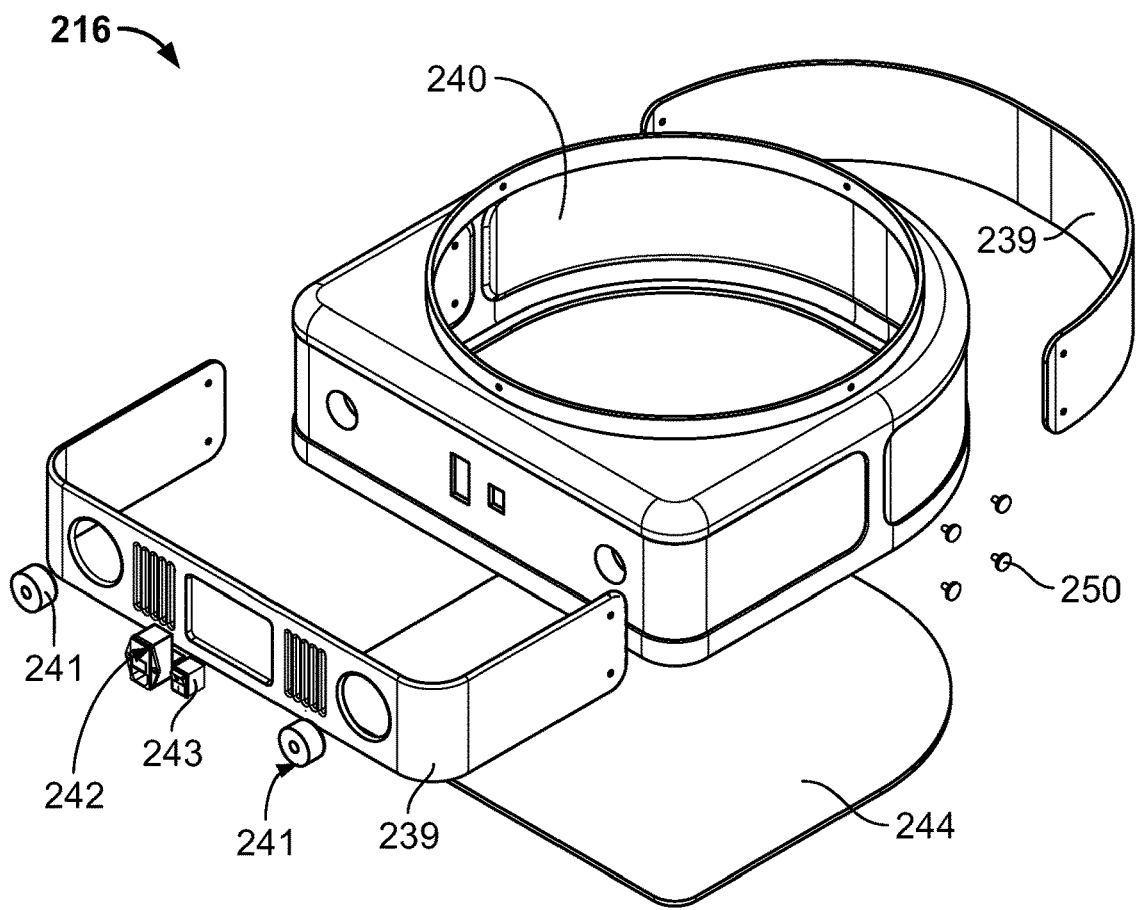
FIG. 5 is an exploded perspective view of a base of the robot of the interactive laboratory robotic system.
Figure 6:
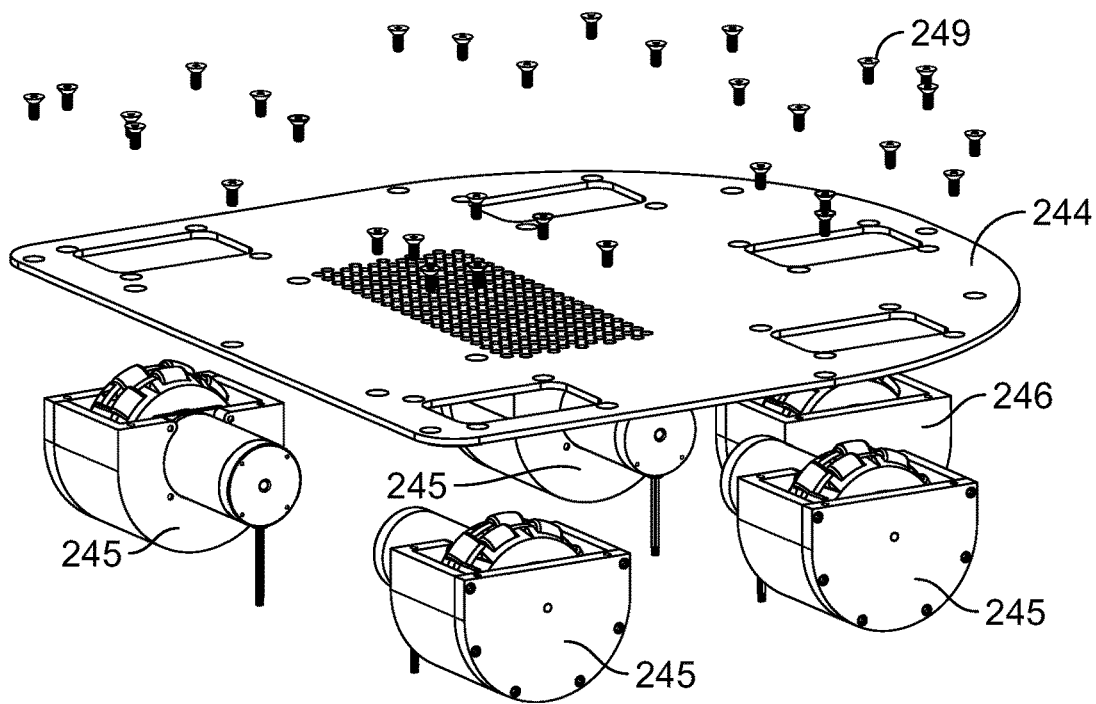
FIG. 6 is an exploded perspective view of a drive train in the base of the robot of the interactive laboratory robotic system.

The base 216 can include a drive train to allow movement of the robot 102, mating connectivity to enable the robot 102 to mate with a base station (e.g., mobile cart 112), and power connectivity to enable the power source of the robot 102 to be charged. More detail of the base 216 is shown in FIGS. 5-7. As shown in FIG. 5, the base 216 can be constructed of several components, such as a central base 240 and bumpers 239 to protect the robot 102 and objects in the environment that the robot 102 may come in contact with. The bumpers 239 may be attached to the central base 240 using suitable fasteners 250. The mating connectivity of the base 216 can include electromechanical connectivity to enable the robot 102 to mate with the base station. For example, the mating connectivity may include magnets 241 (e.g., electromagnets). The power connectivity of the base 216 can include a power socket 242 for charging of the power source of the robot 102. One or more switches 243 may be included on the base 216 for turning the robot 102 on and off, controlling modes of the robot 102, and/or for other purposes.

A series of wheel motor subassemblies 245 and/or wheel subassemblies 246 can be attached to a base plate 244 of the base 216, as shown in FIG. 6. Suitable fasteners 249 can be used to attach the subassemblies 245, 246 to the base plate 244. It should be noted that the orientation of the base plate 244 in FIG. 6 is reversed from the other figures, i.e., the top surface shown of base plate 244 in FIG. 6 is towards the bottom of the base 216 and the robot 102. The wheel motor subassemblies 245 can each include a wheel and a motor to drive the wheel. The motors may be powered by the power source of the robot 102. The wheel subassemblies 246 can include a non-driven wheel. Each of the wheels in the wheel motor subassemblies 245 and/or wheel subassemblies 246 can be omnidirectional, e.g., omni wheels, mecanum wheels, so that the robot 102 can move in any direction.

Figure 7:
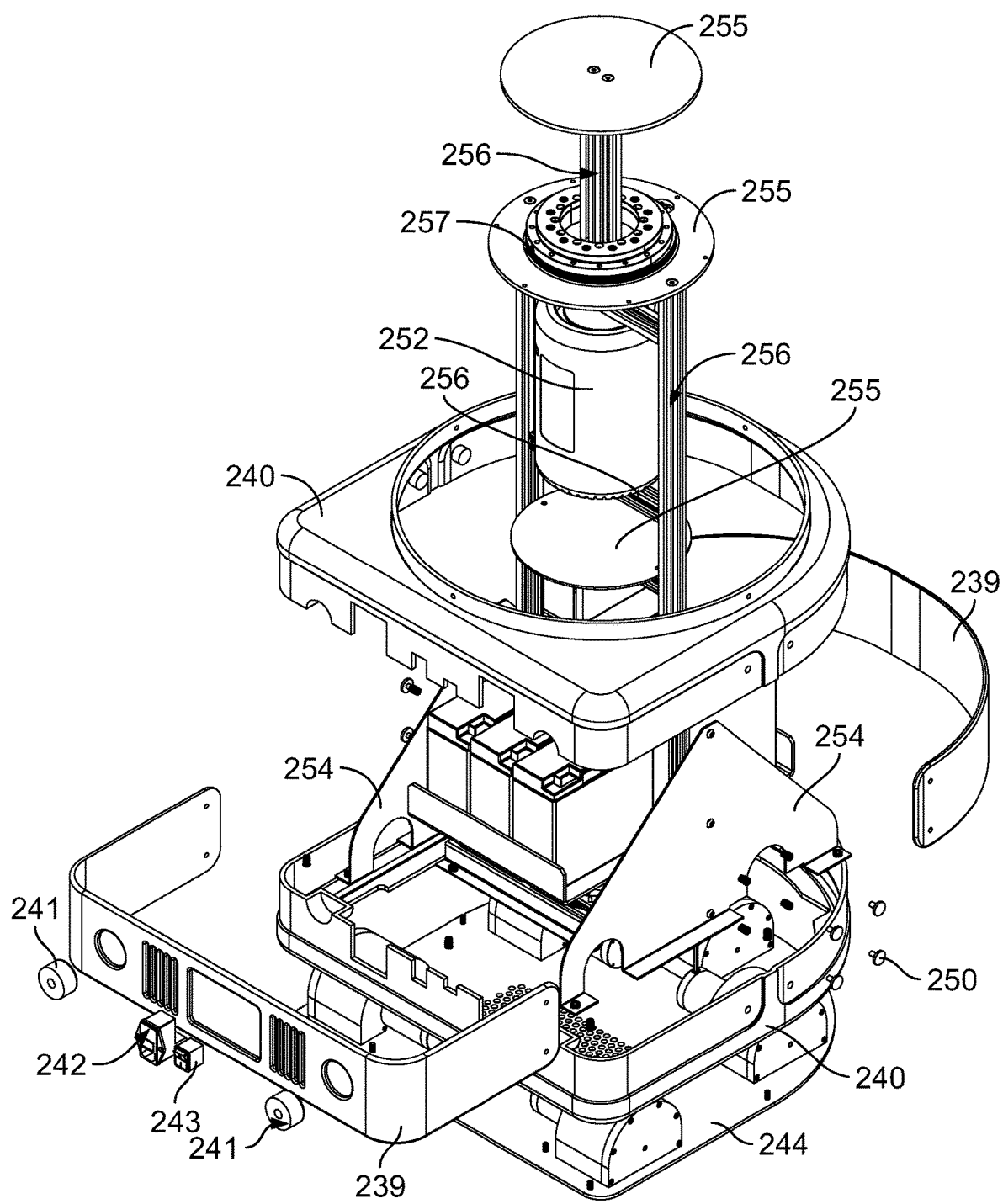
FIG. 7 is an exploded perspective view of the base and internal components of the robot of the interactive laboratory robotic system.

The base 216 and internal components of the robot 102 are shown in FIG. 7. The internal components may be situated upon the base 216 and housed within the body 214 of the robot 102, for example. The internal components of the robot 102 can include a power source 251, a control unit 252, and structural components. The structural components may include brackets 254, plates 255, and members 256, and other components can be mounted to the structural components. Bearings 257 may also be included in the structural components to enable rotation of the head 202 and/or the turret 204.

The power source 251 can be comprised of one or more suitable rechargeable batteries for powering the components of the robot 102, and can be mounted on the structural components, such as shown in FIG. 7. The power source 251 can be charged when a power socket 242 is connected to a base station. For example, when the robot 102 is mated with a base station, e.g., magnets 241 are connected with a metal plate or corresponding magnets in the base station, and the power socket 242 will be connected to a reciprocal socket on the base station. In some embodiments, the switch 243 will be activated by physically abutting the base station to enable charging of the power source 251.

The control unit 252 can be mounted on the structural components, such as shown in FIG. 7. The control unit 252 can be a computing device having executable software used to facilitate the actions, configuration, and control of the robot 102. Although a single control unit 252 is shown in FIG. 7, multiple instances of control units 252 can be utilized within the robot 102. A suitable memory may also be contained within control unit 252 or in communication with control unit 252 for the storage of data, instructions, and the executable software, for example. Other components of the robot 102 may be in communication with the control unit 252 so that the control unit 252 can receive and send control signals and data to the other components to perform actions, receive information, display information, etc. Such components may include, for example, the sensors and/or cameras of the head 202, tablet interface 222, I/O ports 224, interface 234, unique identification reader 235, mood lights 236, the sensors and/or cameras of the body 214, emergency shutoff switch 238, and wheel motor subassemblies 245.

The hand 212 of arm 208 is shown in more detail in FIGS. 15-21, and is adapted to mate with and grasp certain objects, such as sample tray 104. The hand 212 can be constructed of various components to allow gripping of objects in a controlled fashion so that the objects can be securely held by the hand 212. In particular, as best shown in FIGS. 15-19, movable outer members 261 and movable inner members 263 can be attached to a base 260 of the hand 212. The movable outer members 261 can also be attached to secondary movable components 262. The secondary movable components 262 and movable inner members 263 are attached to grippers 264 such that grippers 264 can expand and contract laterally in the plane of the hand 212. In particular, motors within the base 260 can move the movable outer members 261 and/or movable inner members 263 to cause the grippers 264 to expand and contract. This expansion and contraction can allow one or more bosses 270 on the grippers 264 to mate with corresponding reciprocal cavities 271 on the sample tray 104. In this way, the grippers 264 of the hand 212 can securely grasp the sample tray 104.

Figure 15:
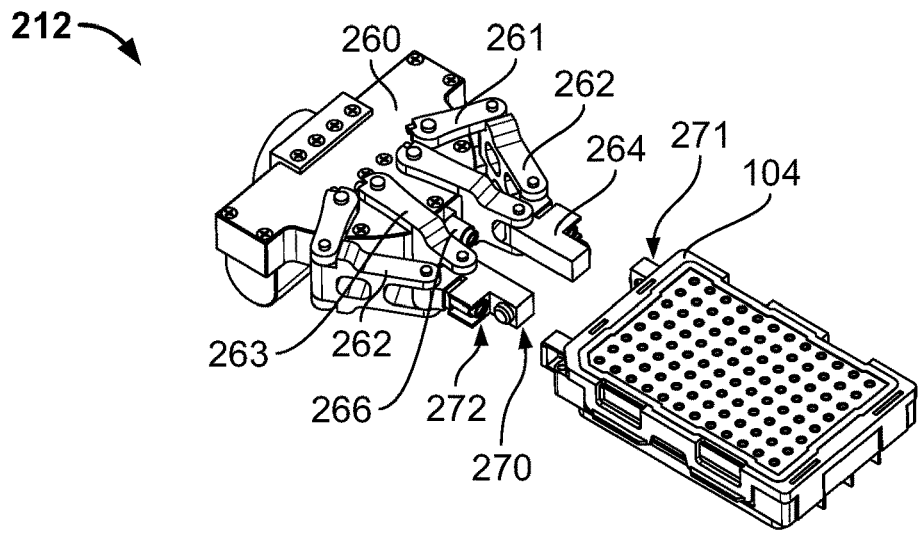
FIGS. 15-21 are perspective and plan views of an embodiment of a hand of the robot of the interactive laboratory robotic system, and a cross-sectional view of the hand engaged with a sample tray of the interactive laboratory robotic system.
Figure 16:
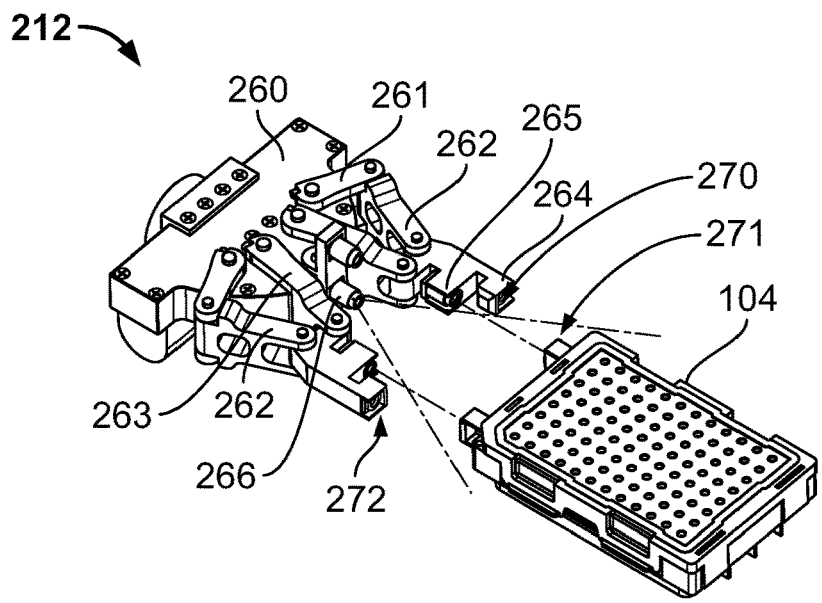
Figure 17:
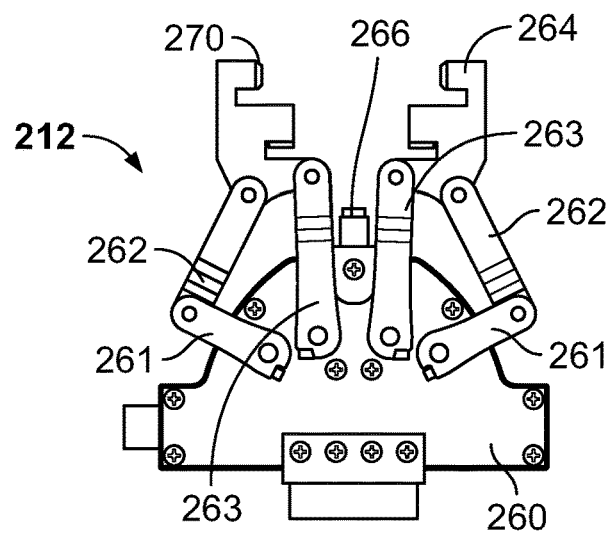
Figure 18:
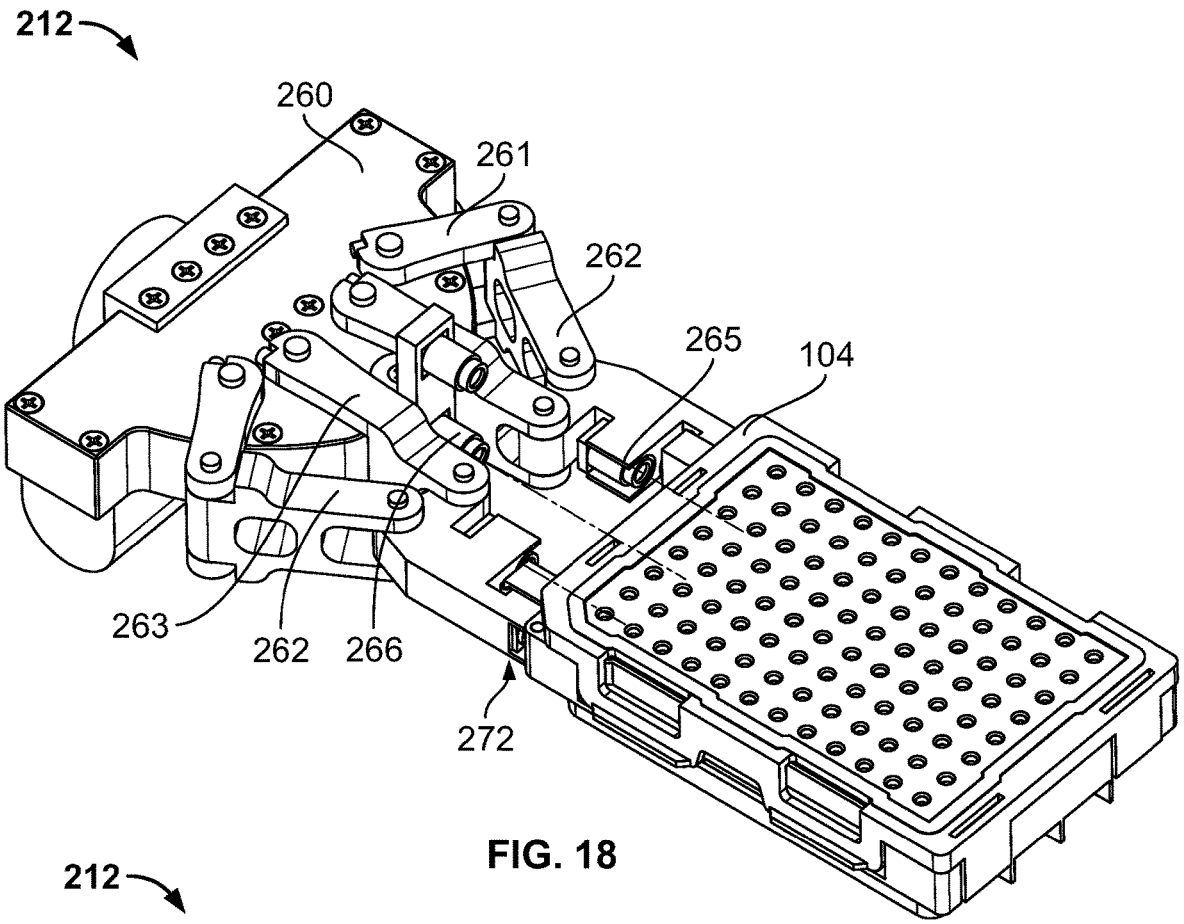
Figure 19:
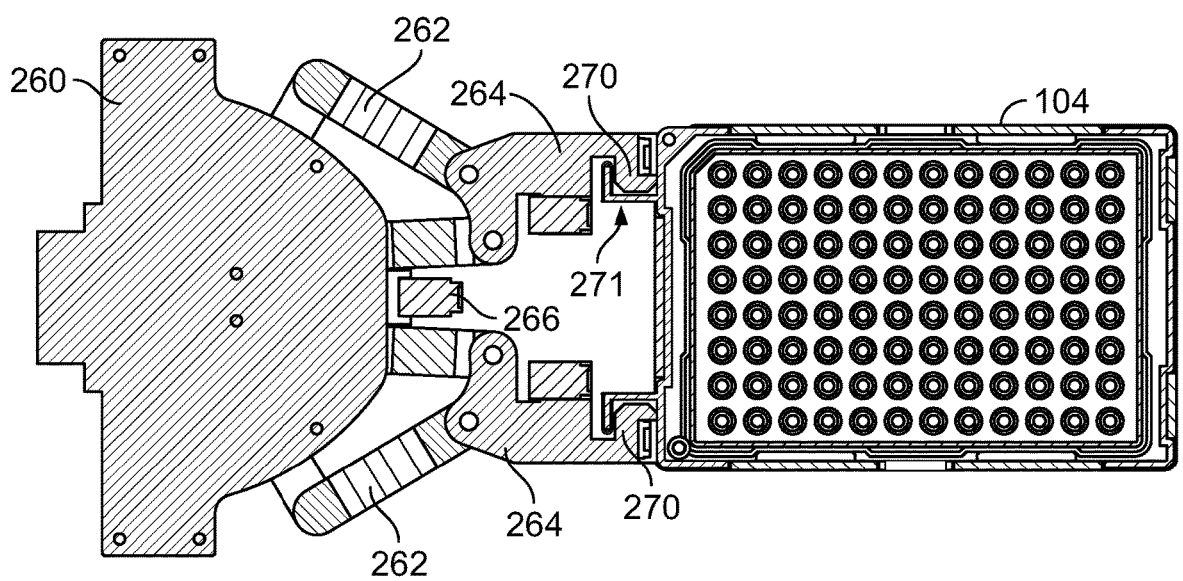
Figure 20:
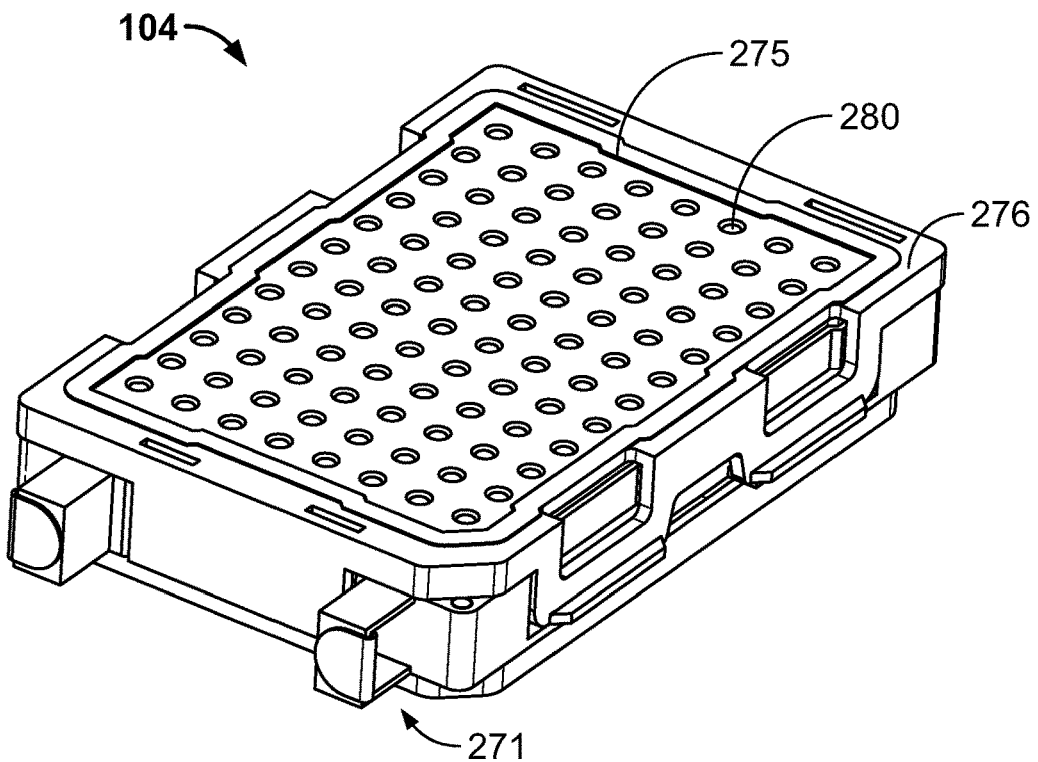
Figure 21:
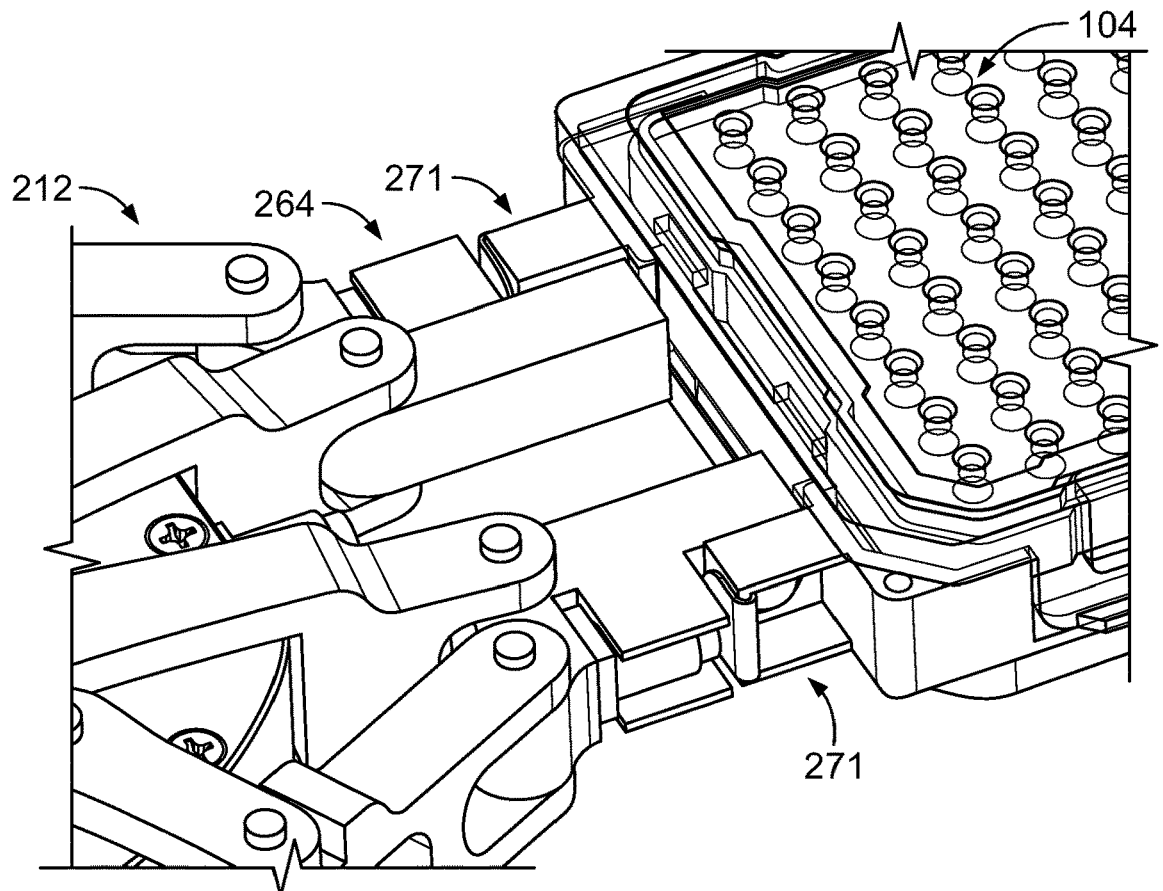

For example, FIGS. 15, 17, and 21 show a hand 212 that is adapted to expand so that the bosses 270 mate with corresponding cavities 271 on the sample tray 104. In particular, FIG. 15 shows the hand 212 prior to mating with the sample tray 104, where the grippers 264 are in a contracted position while approaching the sample tray 104. As shown in FIG. 21, the grippers 264 have been expanded so that the bosses 270 have mated with the corresponding cavities 271 and the hand 212 is securely grasping the sample tray 104. In this case, the cavities 271 are open towards the center of the sample tray 104 to allowing mating with the bosses 270. As another example, FIGS. 16, 18, and 19 show a hand 212 that is adapted to contract so that the bosses 270 mate with corresponding cavities 271 on the sample tray 104. In particular, FIG. 16 shows the hand 212 prior to mating with the sample tray 104, where the grippers 264 are in an expanded position while approaching the sample tray 104. As shown in FIGS. 18 and 19, the grippers 264 have been contracted so that the bosses 270 have mated with the corresponding cavities 271. In this case, the cavities 271 are open away from the center of sample tray 104 to allow mating with the bosses 270.

One or more cameras 266 and one or more unique identification readers 272 can be included on hand 212 so that the robot 102 can identify a particular sample tray 104, interpret specific instructions sets, and/or interpret routines extracted by one or more unique identifiers. Cameras 266 mounted in the center of the hand 212 can be utilized to ensure the hand 212 is properly guided to pick up the sample tray 104. In particular, the camera 266 can detect the center of the sample tray 104, e.g., through detection of a color blob or other indicia, so that the grippers 264 will be in the correct position while approaching the sample tray 104. After the hand 212 has moved towards the sample tray 104, the grippers 264 can expand or contract (depending on the specific embodiment of the hand 212, as described previously). During expansion or contraction of the grippers 264, cameras 266 mounted in the grippers 264 can detect color blobs or other indicia on the sample tray 104 to ensure that the grippers 264 are in the correct position to ensure mating of the bosses 270 and cavities 271. In addition, unique identification readers 272 mounted on the hand 212 can read unique identifiers on the sample tray 104 to ensure that the hand 212 is retrieving the intended sample tray 104. For example, the sample tray 104 may have RFID chips, microchips, and/or unique identifiers that can be read by the unique identification readers 272. The cameras 266 and/or unique identification readers 272 on the hand 212 can be selectively utilized by the robot 102 to identify a particular sample tray 104 by sensing visual patterns, colors, RFID chips, microchips, proximity, and/or other unique identifiers.

Figure 42:
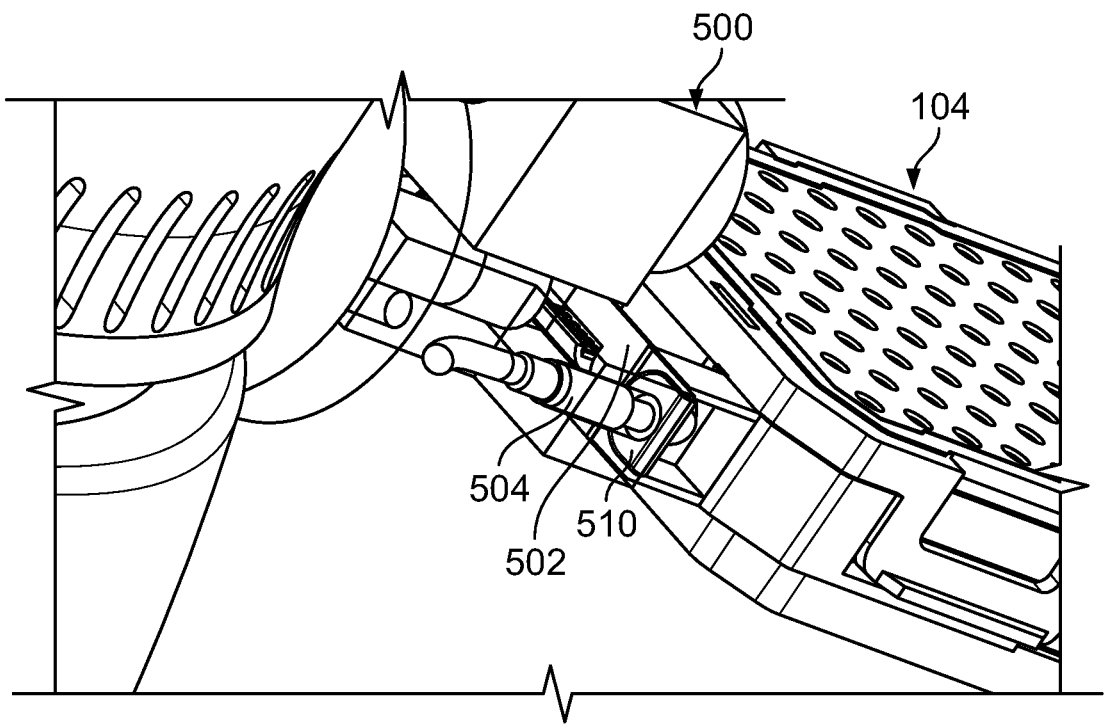
Figure 43:
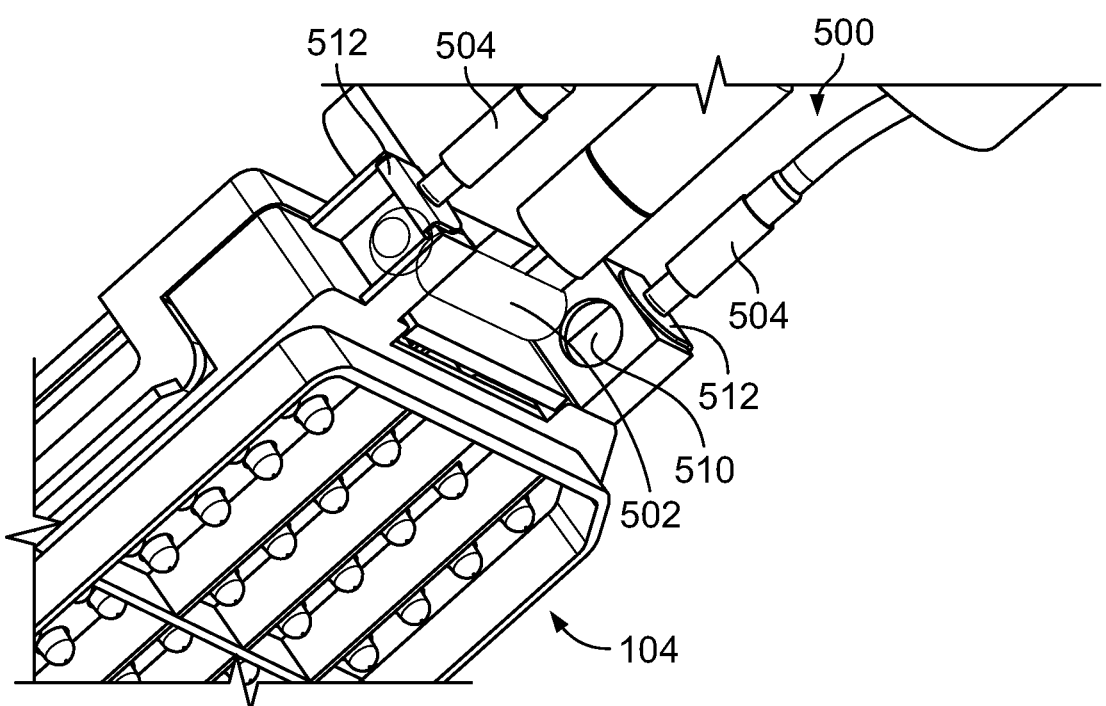

An embodiment of hand 500 for the robot 102 is shown in more detail in FIGS. 40-43, and is adapted to mate with and manipulate objects, such as a sample tray 104. The hand 500 may be mounted on the end of the arm 206, for example. The hand 500 may include an attachment mechanism 502 to allow engagement with the sample tray 104 in a controlled fashion. As best shown in FIGS. 42 and 43, the hand 500 can mate with the sample tray 104 by engaging the attachment mechanism 502 with mounting holes 510 of the sample tray 104. In particular, a piston of the attachment mechanism 502 can cause a post to travel through and engage with the mounting holes 510. A camera 506 and unique identification readers 504 can be included on hand 500 so that the robot 102 can identify a particular sample tray 104 and enable the hand 500 to align with the sample tray 104 for mating. The unique identification readers 504 may abut tabs 512 on the sample tray 104 to ensure proper alignment of the hand 500. Camera 506 can also be utilized to determine if receiving slots 310 of an interactive shelf are full or empty.

The sample tray 104 is capable of holding biological samples, and is shown in more detail in FIGS. 20 and 36-39. The sample tray 104 can be comprised of an internal tray 275 and an external tray 276. The internal tray 275 can fit into the external tray 276, and may include a series of wells 280 for holding the biological samples. The external tray 276 can include mating cavities 271 that allow grasping by the hands 212, and unique identifiers for uniquely identifying the sample tray 104, as described above. The unique identifiers may be held in one or more holding bosses 278, for example. The combination of unique identifiers for the internal tray 275 and the external tray 276 may identify a particular sample tray 104, in some embodiments.

Figure 22:
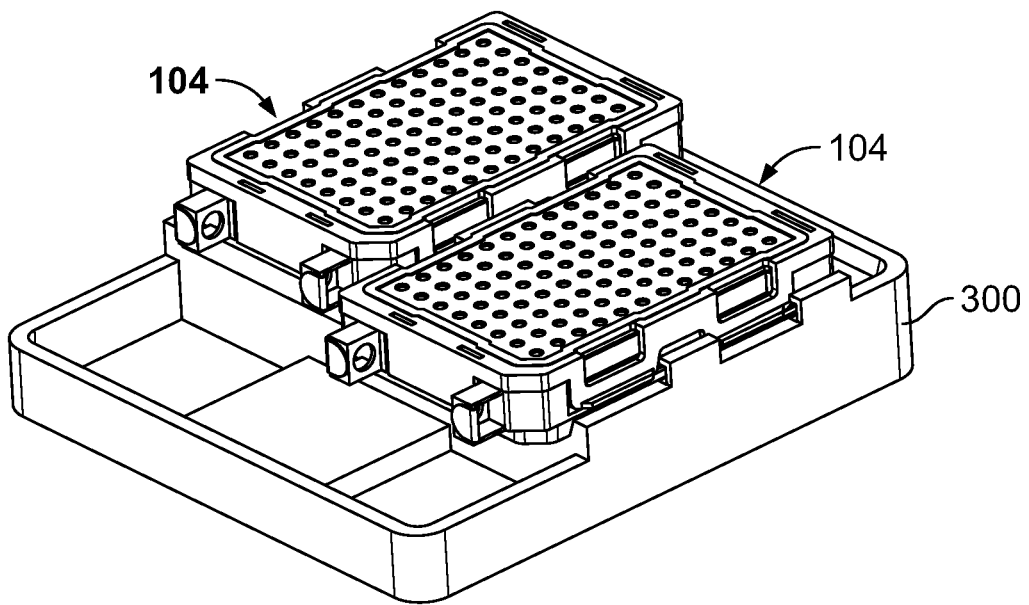
FIGS. 22-24 are perspective and plan views of a tray carriage of the interactive laboratory robotic system for holding sample trays, and of the tray carriage in a DNA sequencer.
Figure 23:
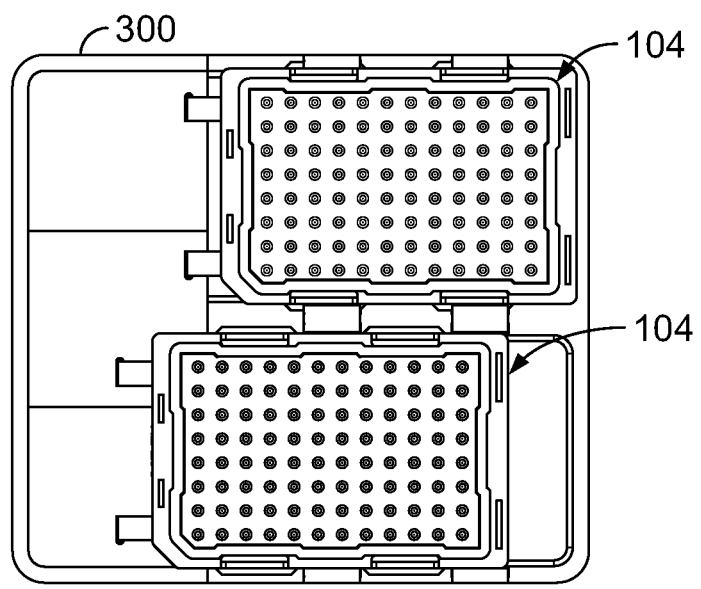
Figure 24:
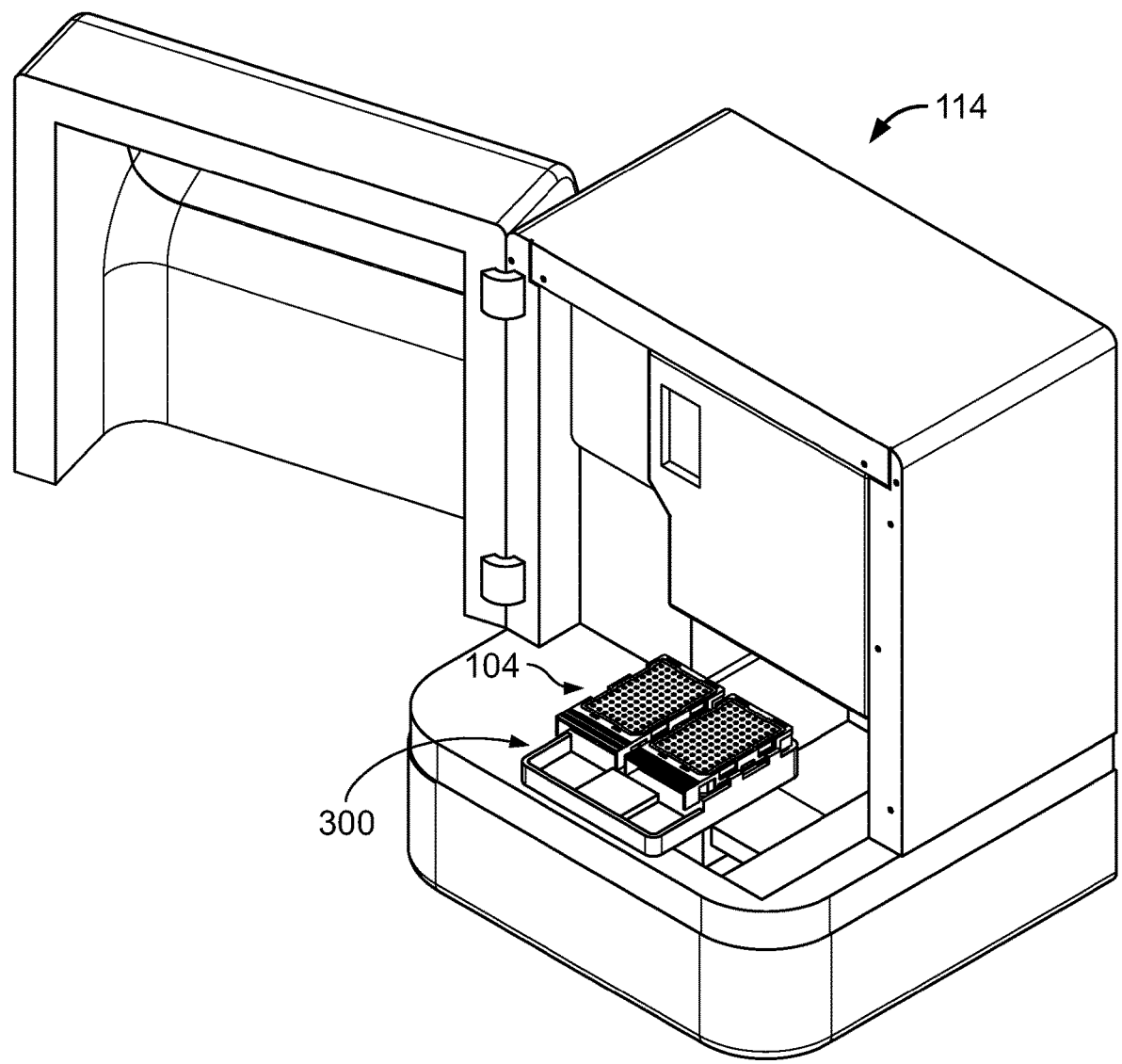

A tray carriage 300 can hold one or more sample trays 104 during particular steps of the DNA sequencing process, as shown in FIGS. 22-24. In particular, the tray carriage 300 can be mounted within a DNA sequencer 114 so that sample trays 104 can be secured in the tray carriage 300 during processing. Sample trays 104 can be placed in receptacles of the tray carriage 300 by the robot 102, for example. In embodiments, a sample tray 104 can initially be placed in a receptacle of the tray carriage 300, as shown at the bottom of FIG. 23, and then be locked into position in the receptacle, as shown at the top of FIG. 23. The hand 212, for example, may place a sample tray 104 in the tray carriage 300 and lock the sample tray 104 into place. In some embodiments, the tray carriage 300 may be utilized in other pieces of equipment.

Figure 25:
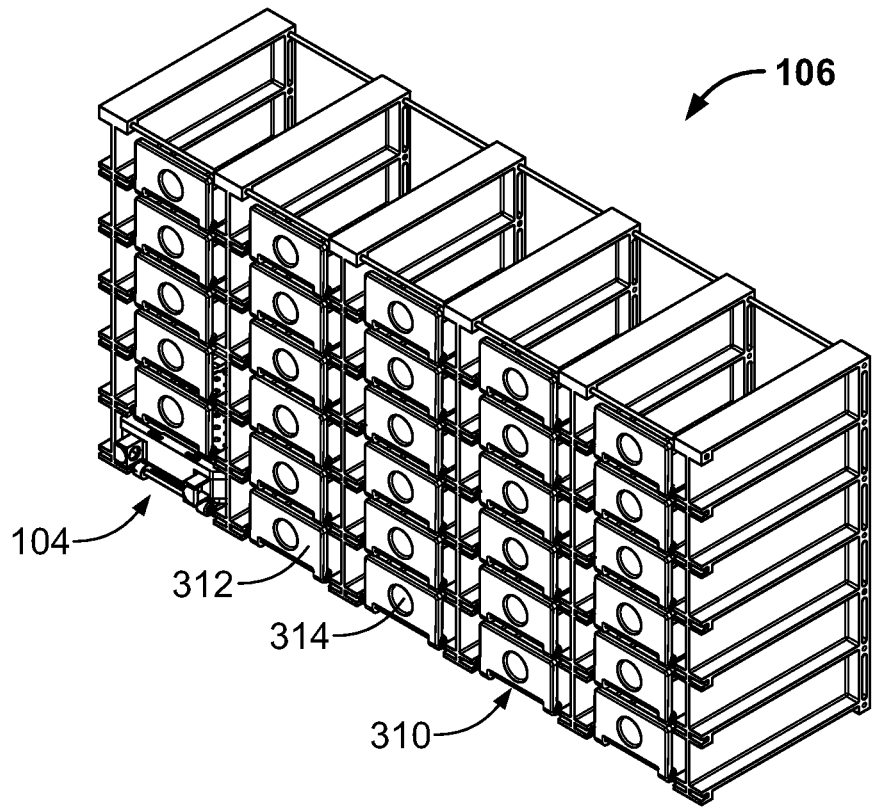
FIGS. 25-26 are perspective and elevational views of an interactive shelf of the interactive laboratory robotic system.
Figure 26:
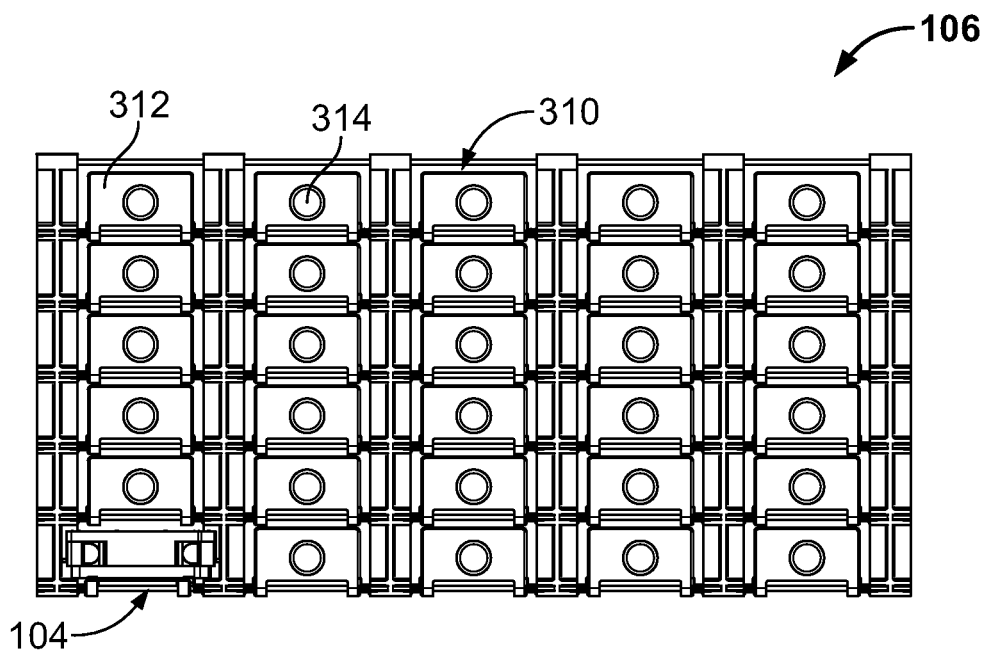

Sample trays 104 can be stored in an interactive shelf 106, as shown in FIGS. 25-26. Although interactive shelf 106 is shown in FIGS. 25-26, interactive shelf 106 is representative of and substantially similar to interactive shelves 108 and 110 shown in FIG. 1 that are placed upon a table and on a mobile cart 112, respectively. In addition, interactive shelf 106 may also be mounted within refrigeration unit 116, as described below. Interactive shelf 106 may include a series of receiving slots 310 for receiving and holding sample trays 104. The receiving slots 310 can be in any suitable arrangement, such as rows and columns.

Each receiving slot 310 can be equipped with a flap 312 having a unique identifier, such as a color blob 314. The flap 312 may be hinged and spring loaded so that when a sample tray 104 is not in a receiving slot 310, the flap 312 is vertical so that the color blob 314 is visible. Conversely, when a sample tray 104 is present in a receiving slot 310, the flap 312 is pushed down and horizontal so that the color blob 314 is not visible. The color blob 314 may be scanned and detected, e.g., by sensors and/or cameras included in the head 202 or hand 212 of the robot 102, to determine whether a particular receiving slot 310 is full or empty.

Figure 30:
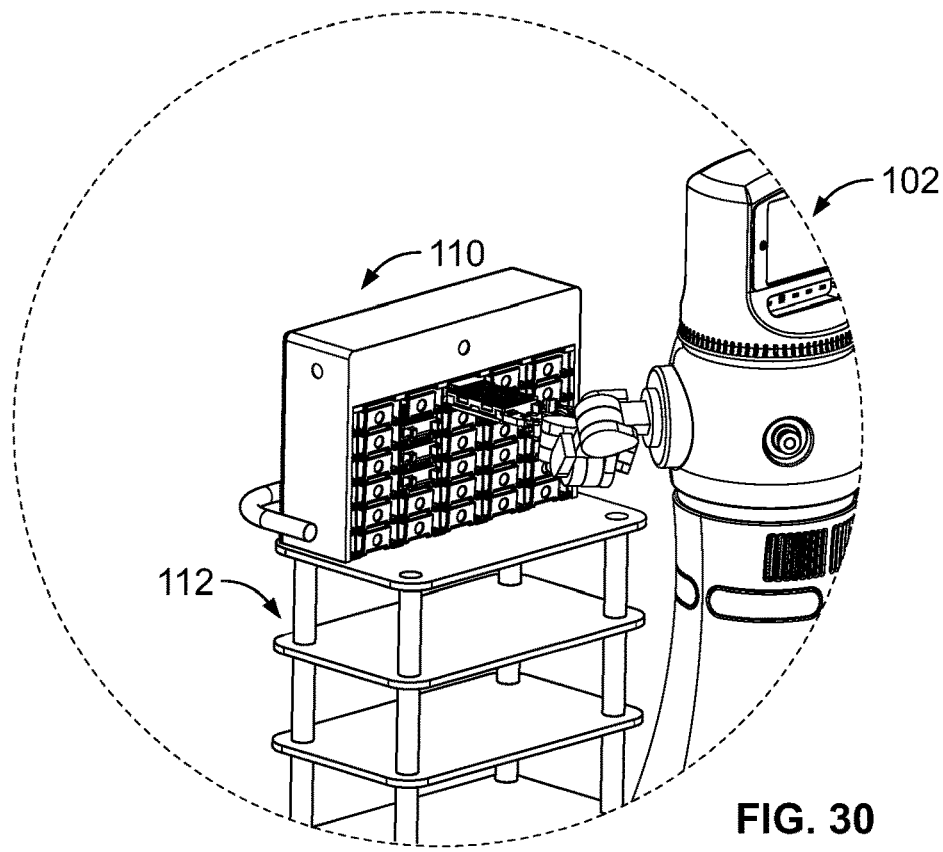
FIGS. 30-31 are depictions of the robot of the interactive laboratory robotic system interacting with an interactive shelf on the mobile cart and with an interactive shelf in a refrigeration unit.
Figure 31:
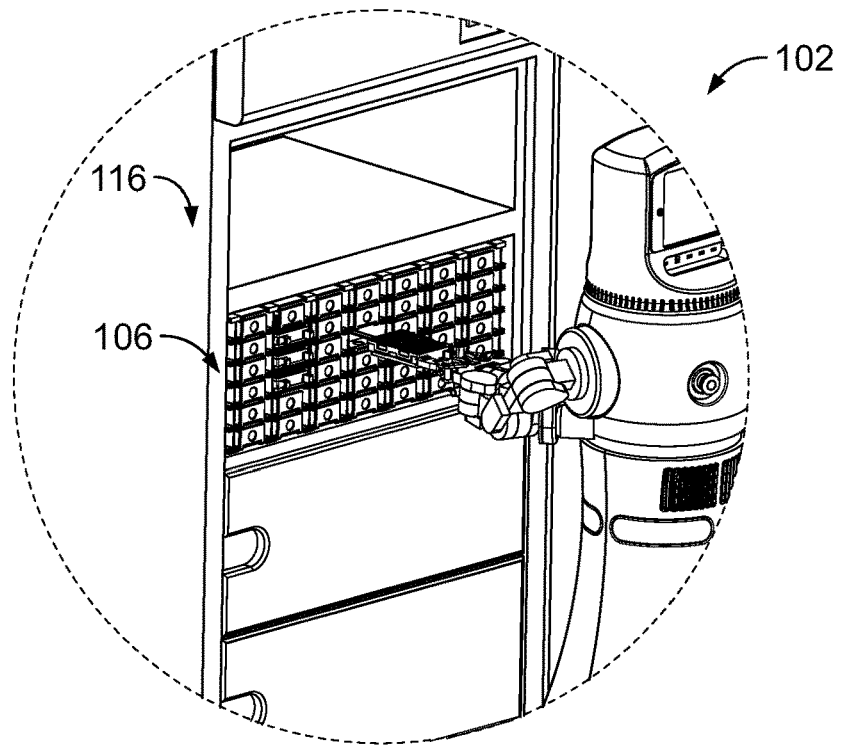
Figure 32:
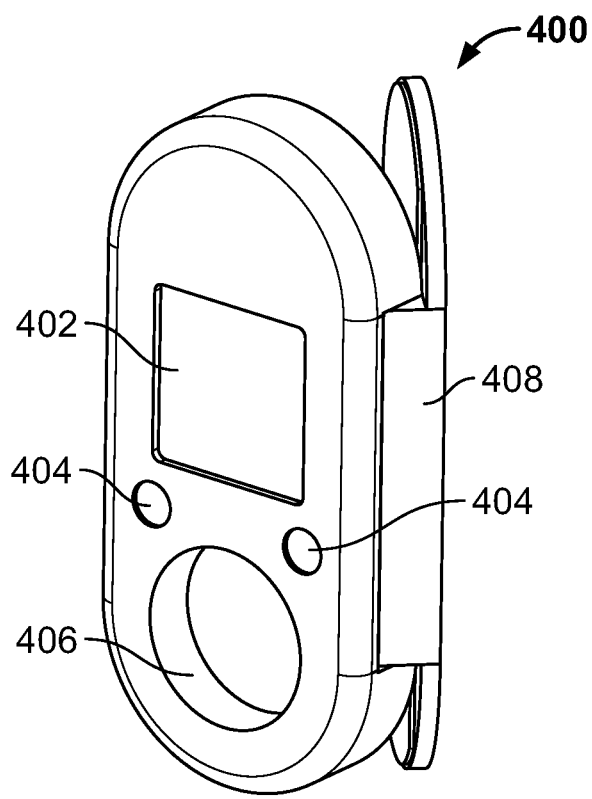
FIG. 32 is a perspective view of an accessory unit of the interactive laboratory robotic system for enabling the robot to engage and open a door of a piece of equipment.

For example, the robot 102 may be holding a sample tray 104 in hand 212 that is to be placed in the interactive shelf 106. Sensors in the head 202 and/or the hand 212 of the robot 102 can scan the interactive shelf 106 to determine which receiving slots 310 are full or empty. The sample tray 104 being held can then be placed into an empty receiving slot 310. As another example, the robot 102 may approach the interactive shelf 106 to retrieve a particular sample tray 104. Sensors and/or cameras in the head 202 and/or the hand 212 of the robot 102 can scan the interactive shelf 106 to determine which receiving slots 310 are full. The robot 102 can then move the hand 212 to only the receiving slots 310 that are full so that the particular sample tray 104 to be retrieved is detected. The hand 212 can utilize the unique identification reader 272 to read the unique identifiers on the sample trays 104 to find the intended sample tray 104. As examples, FIG. 30 depicts that the robot 102 can insert and/or remove sample trays 104 from an interactive shelf 110 on a mobile cart 112, and FIG. 31 depicts that the robot 102 can insert and/or remove sample trays 104 from an interactive shelf 106 in a refrigeration unit 116.

Figure 27:
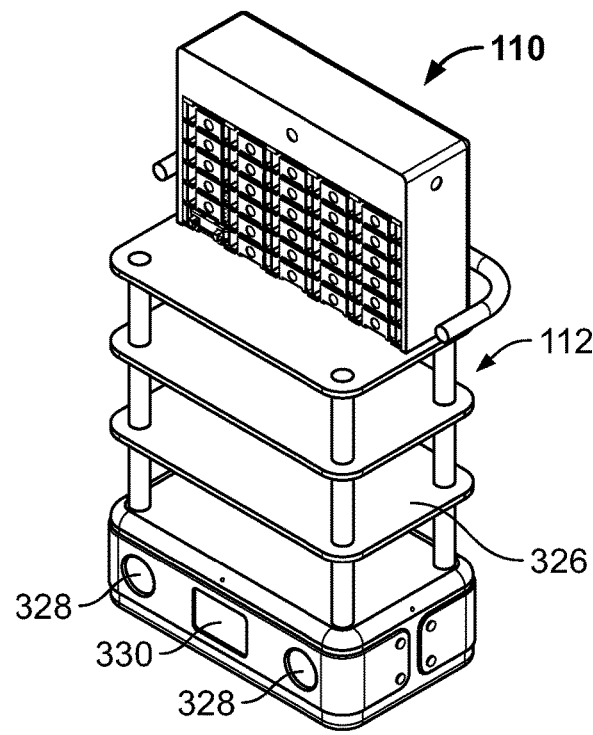
FIGS. 27-29 are perspective and elevational views of a mobile cart of the interactive laboratory robotic system.
Figure 28:
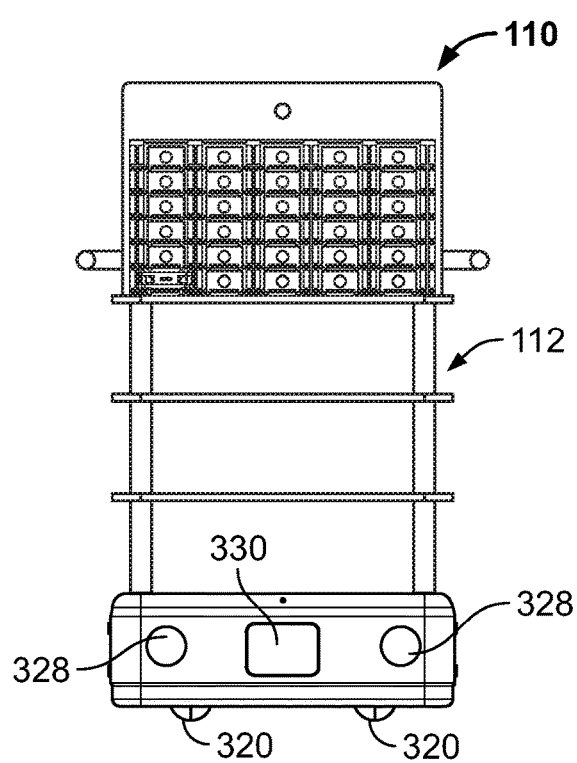
Figure 29:
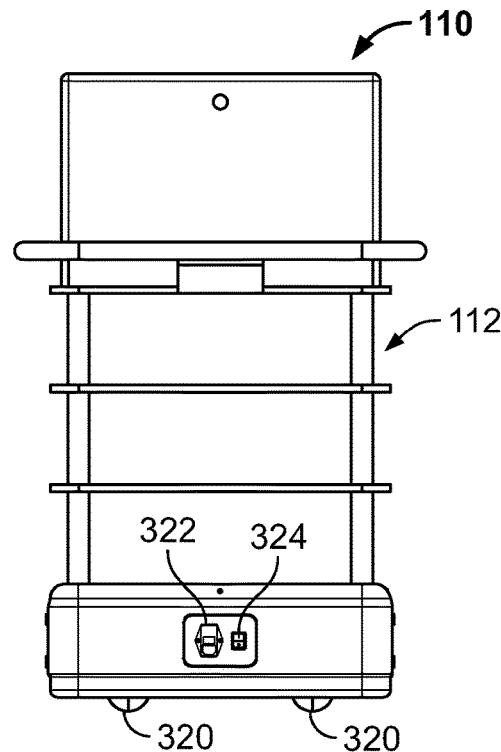

FIGS. 27-29 show a mobile cart 112 with an interactive shelf 110 for sample trays 104, as described above. Other shelves 326 can be included on the mobile cart 112 for storage of other items. Wheels 320 allow the mobile cart 112 to be moved manually by personnel and/or by the robot 102 when mated. Metal plates 328 can connect with magnets 241 on the robot to ensure a secure mating of the mobile cart 112 and the robot 102. In some embodiments, the metal plates 328 may include switchable electromagnets to allow ease of mating and unmating of the robot 102 and mobile cart 112, for example. The mobile cart 112 can include a power source that can be charged through a power socket 322. The power source on the mobile cart 112 can be used to charge the power source of the robot 102. In particular, the power socket 242 of the robot 102 can be connected to a power input/output panel 330 of the mobile cart 112 to charge the power source of the robot 102. The power input/output panel 330 may include one or more power interfaces to connect with the power socket 242 of the robot 102. One or more switches 324 may be included on the mobile cart 112 for turning the mobile cart 112 on and off, controlling modes of the mobile cart 112, and/or for other purposes. The robot 102 can continue to move about the environment and perform tasks while mated to the mobile cart 112.

As shown in FIGS. 32-35, accessory unit 400 can be attached to a door of existing equipment, such as DNA sequencer 114 and refrigeration unit 116, to enable the robot 102 to open and close the door. For example, hand 210 of the robot can include a magnet that can mate with the accessory unit 400. The accessory unit 400 can include an identifying device 402, such as a screen, barcode, or QR code; optical sensors 404; a metal plate 406, and a hinge 408. The accessory unit 400 can be attached to the door of existing equipment using adhesive, screws, bolts, and/or other fasteners, for example.

The identifying device 402 allows the robot 102 to uniquely identify the piece of equipment, such as by reading a QR code with a camera of the robot 102. In some embodiments, the display of the identifying device 402 may be dynamic and changeable to convey information to the robot 102, such as the contents of the piece of equipment, location of the piece of equipment, time, date, state of the equipment, status of the equipment, and/or other information, for example. When the robot 102 is to open a door of a piece of equipment, the hand 210 can approach the accessory unit 400 and the robot 102 can read the identifying device 402 to ensure that the correct piece of equipment is being interacted with and/or to obtain information. The robot 102 can utilize the optical sensors 404 to optically and/or wirelessly align the hand 210 for mating with the metal plate 406. The hand 210 can then mate with the metal plate 406 of the accessory unit 400, such as with a magnet in the hand 210. The robot 102 can open the door by retracting the arm 206 and/or by movement of the robot 102. As the door is opened, the accessory unit 400 can rotate on the hinge 408 so that the door can be properly opened. The accessory unit 400 can also rotate on the hinge 408 during closure of the door.

Figure 33:
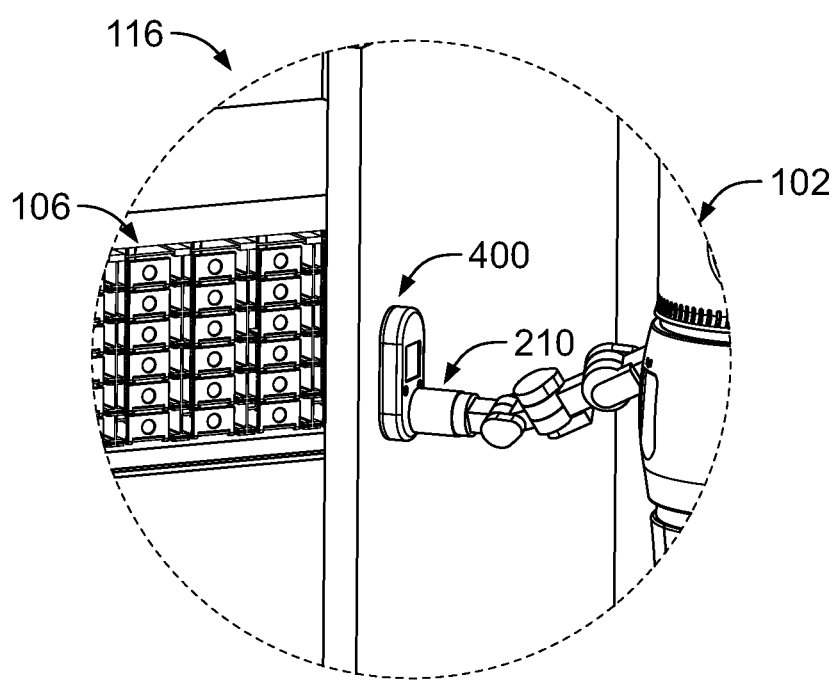
FIG. 33 is a depiction of the robot of the interactive laboratory robotic system interacting with the accessory unit attached to a refrigeration unit.
Figure 34:
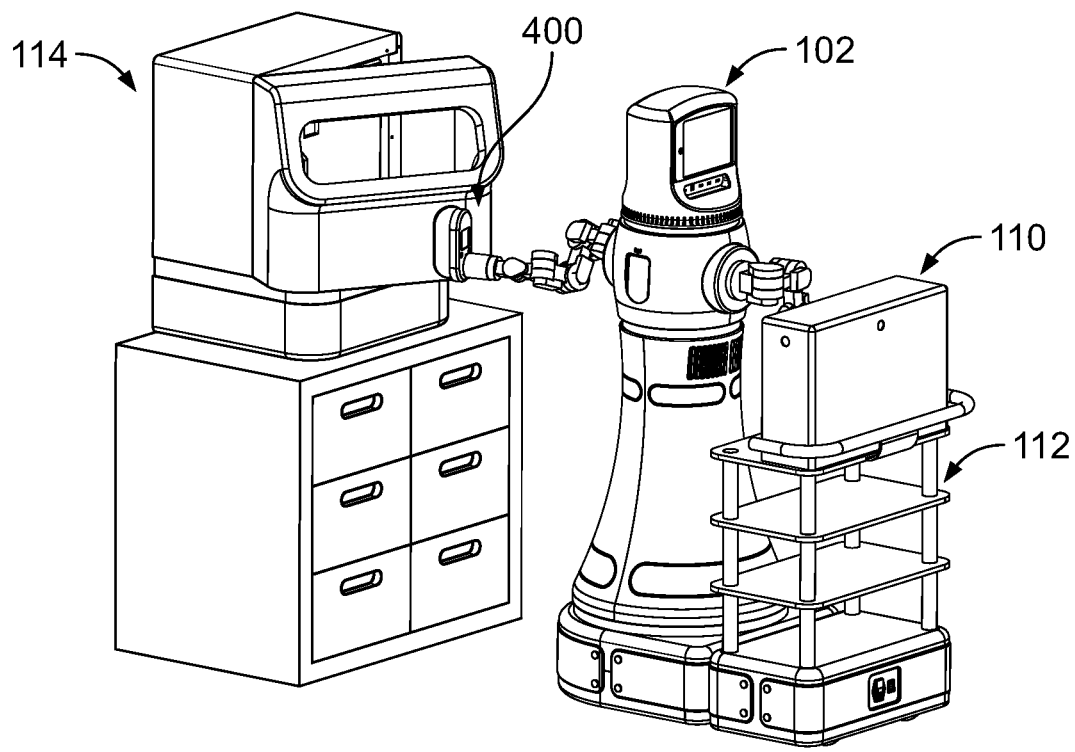
FIGS. 34-35 are depictions of the robot of the interactive laboratory robotic system mated to the mobile cart and interacting with an accessory unit attached to a DNA sequencer.
Figure 35:
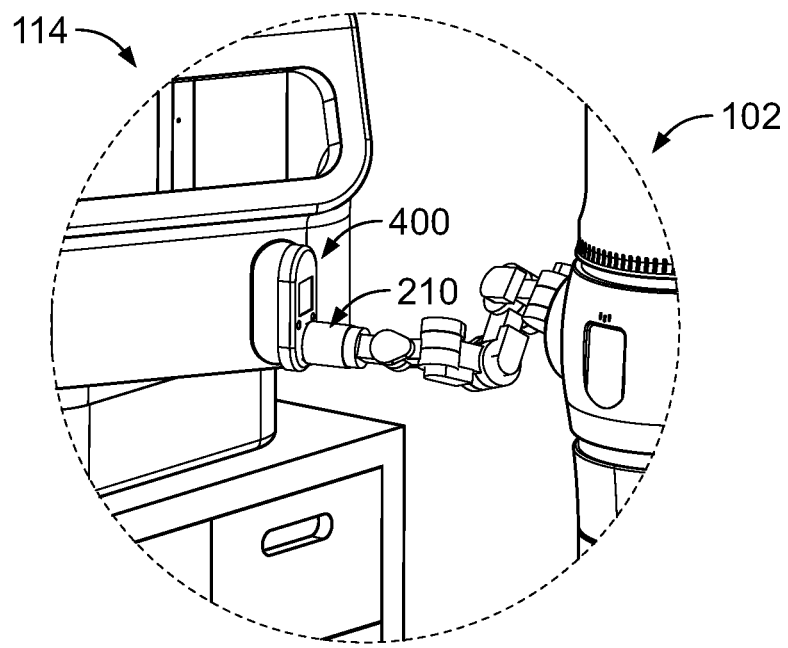
Figure 36:
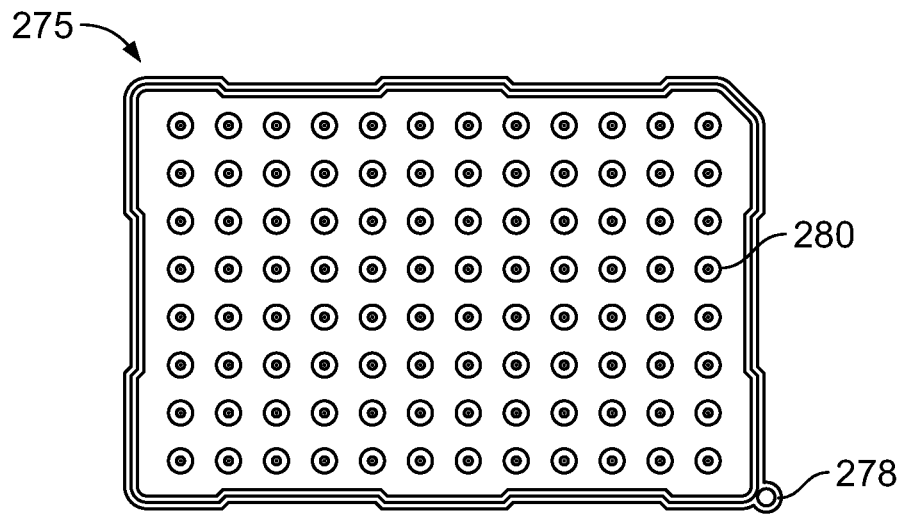
FIGS. 36-39 are views of an internal component of the sample tray of the interactive laboratory robotic system.
Figure 37:
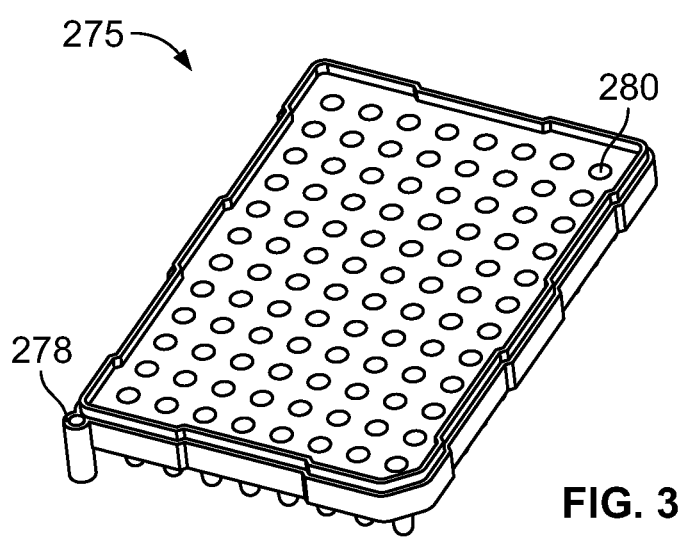
Figure 38:
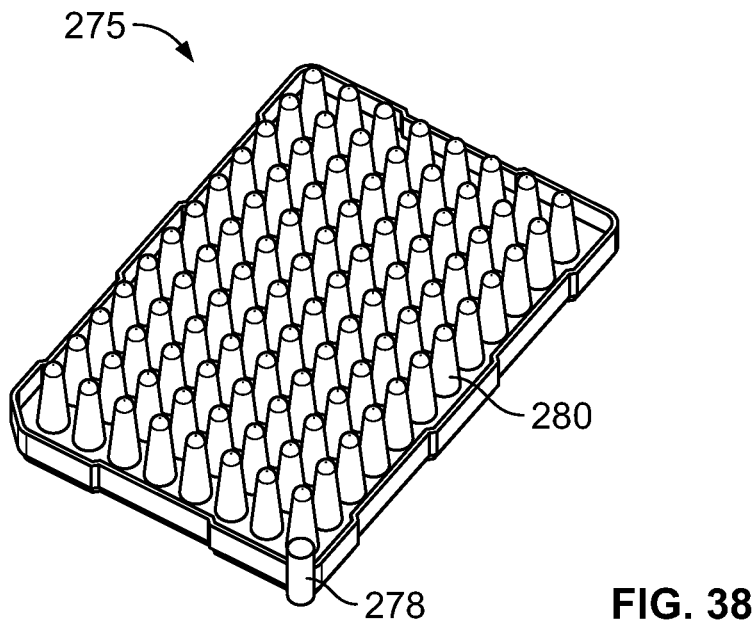
Figure 39:
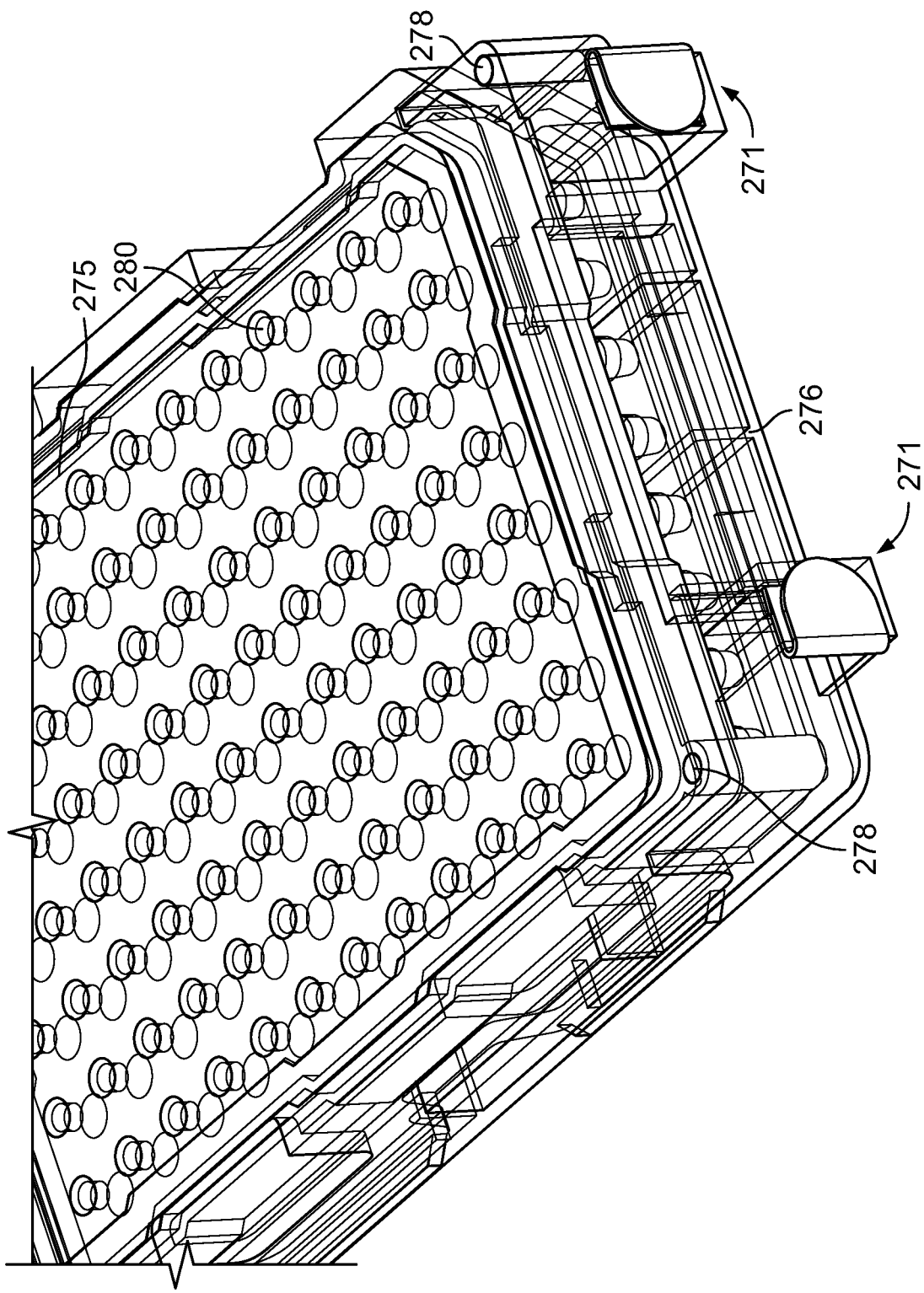
Figure 40:
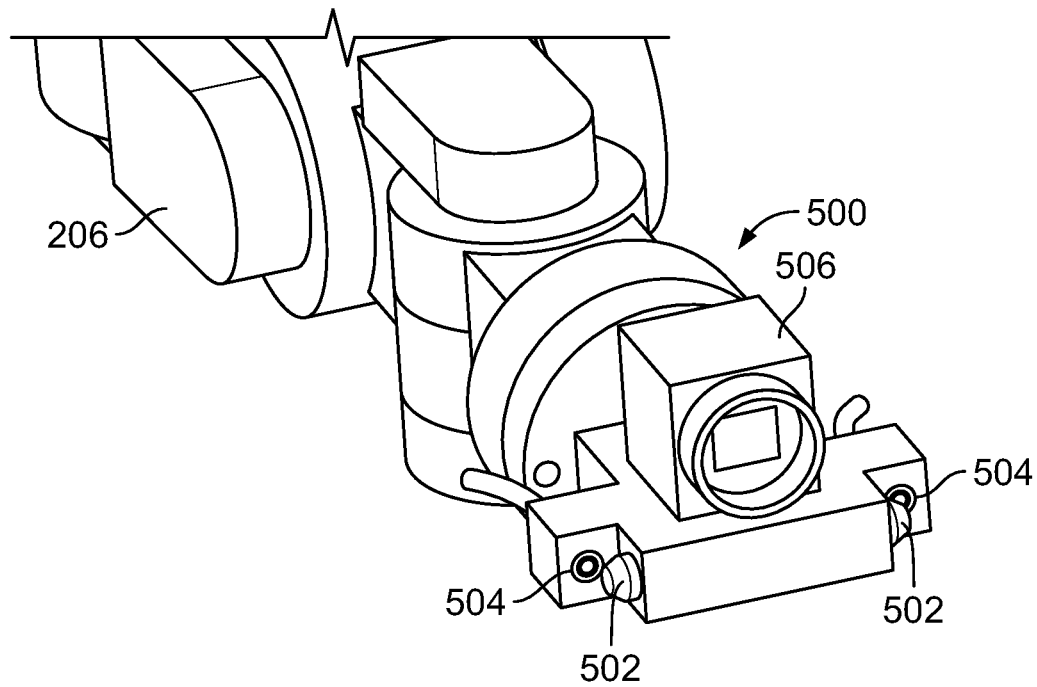
FIGS. 40-43 are views of another embodiment of a hand of the robot of the interactive laboratory robotic system, and cutaway views of the hand engaged with a sample tray of the interactive laboratory robotic system.
Figure 41:
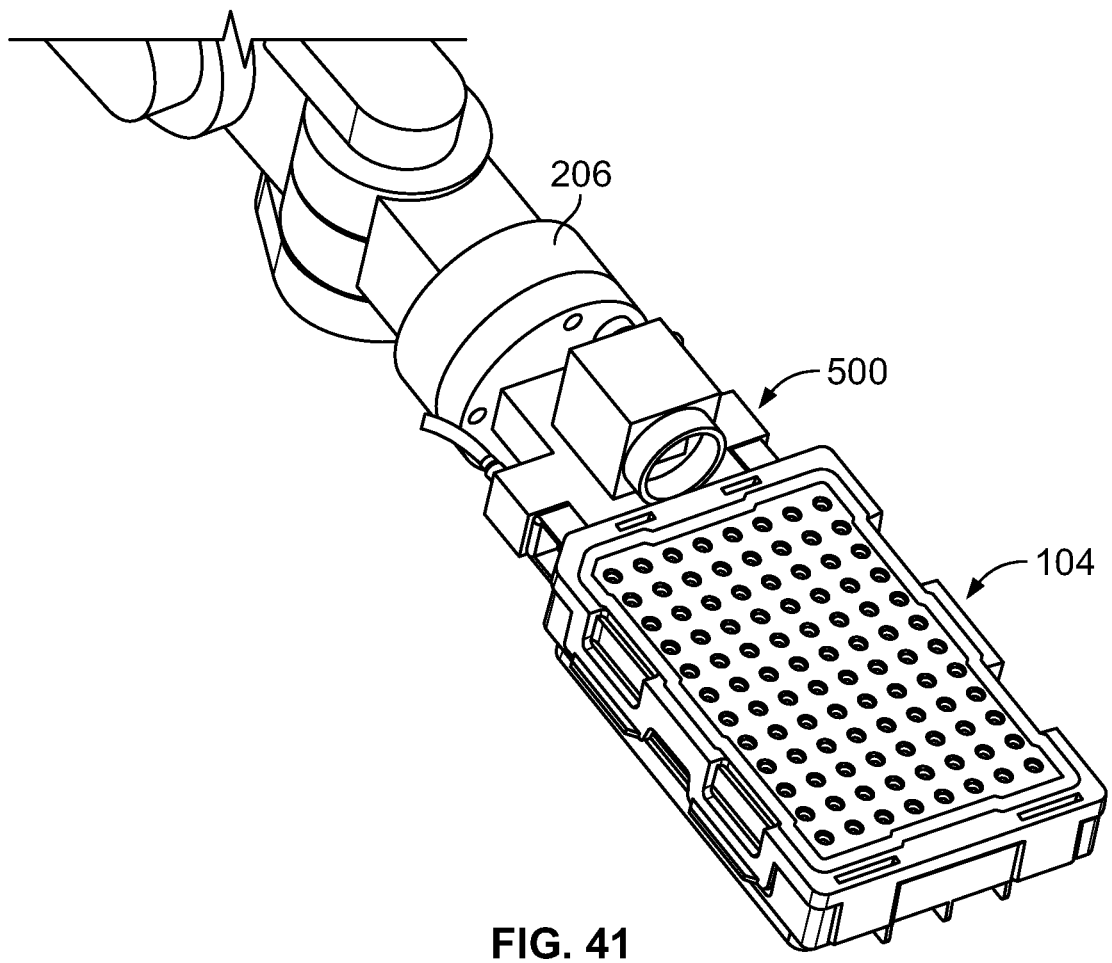

Other tasks can be performed by the other hand 212 while the hand 210 is opening the door. For example, the hand 212 can retrieve a sample tray 104 from an interactive shelf 110 on mobile cart 112 while simultaneously opening the door of a DNA sequencer 114 via an accessory unit 400, as shown in FIG. 34. In FIG. 33, the robot 102 is shown opening the door of a refrigeration unit 116 by interacting with the accessory unit 400. The robot 102 is shown opening the door of a DNA sequencer 114 by interacting with the accessory unit 400 in FIGS. 34 and 35. In addition, FIG. 34 depicts the robot 102 while mated to the mobile cart 112, such as when the robot 102 is being charged by the mobile cart 112.

Transactional and/or analytical data associated with the biological samples and/or sample trays 104 can be automatically captured by the robot 102 during the DNA sequencing process. Such data may include, for example, identifiers of the sample trays 104, locations of the sample trays 104, and actions that have been performed to the sample trays 104 with timestamps. Locations of the sample trays 104 may include the specific location of sample trays 104 within shelves 106, 108, 110, DNA sequencer 114, and/or refrigeration unit 116. As another example, the data may include monitoring data of the environment, such as images and video taken by cameras, temperature, humidity, detection of chemical vapors, etc. As a further example, the data may include locations of where the robot 102 has been can also be recorded for auditing purposes, for example. The collected data can be stored, analyzed, and/or disseminated, as needed.

It should be emphasized that the above-described embodiments of the invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the invention and protected by the following claim(s).

The invention claimed is:

1. An interactive laboratory robotic system, comprising:
(A) an interactive humanoid robot, comprising:
a head and a turret modularly engaged to the head, wherein the head and the turret are each independently rotatable;
at least one arm modularly engaged to the turret, the at least one arm comprising a hand configured to mate with and grasp an object;
a body modularly engaged to the turret and comprising a processor; and
a base modularly engaged to the body and comprising a drive train configured to move the robot, and a base mating interface configured to connect the robot to a base station;
(B) an interactive shelf, comprising a plurality of receiving slots each configured to hold a sample tray, each of the plurality of receiving slots comprising a hinged flap and a unique slot identifier for uniquely identifying one of the plurality of receiving slots; and
(C) a mobile cart, comprising:
at least one cart attachment mechanism configured to mate with the hand of the robot;
a cart power source; and
an electrical socket electrically connected to the cart power source and configured to connect with a corresponding robot electrical socket of the robot; and
(D) an accessory unit, comprising:
an attachment mechanism configured to enable the accessory unit to be mounted to a door of a piece of equipment;
a hand mating interface configured to mate with the hand of the robot and enable the hand to open and close the door of the piece of equipment; and
a hinge connecting the attachment mechanism and the hand mating interface,
wherein the hand of the robot comprises a hand attachment mechanism, wherein the hand attachment mechanism comprises a magnet that is configured to mate with the hand mating interface of the accessory unit.

2. The system of claim 1, wherein:
the head of the robot comprises a head user interface configured to display information to a user and receive control input from the user, and one or more of at least one sensor or at least one camera disposed within the head;
the turret comprises a turret user interface configured to receive the control input from the user and at least one sleeve interface configured to connect to the at least one arm;
the at least one arm is modularly engaged to the at least one sleeve interface of the turret;
the body comprises a power source, a memory in communication with the processor, and a networking interface in communication with the processor; and
the processor is further in communication with the head user interface, the one or more of the at least one sensor or the at least one camera, the turret user interface, the at least one arm, the hand, and the drive train.

3. The system of claim 1, wherein the hand of the robot comprises a hand camera in communication with the processor and configured to uniquely identify the object and enable alignment of the hand with the object.

4. The system of claim 1, wherein the hand of the robot comprises a unique identification reader in communication with the processor and configured to uniquely identify the object.

5. The system of claim 1, wherein a second hand of the robot comprises a hand base, a plurality of movable members movably connected to the hand base, and grippers movably connected to at least one of the plurality of movable members, wherein the grippers are configured to expand and contract to grasp the object, and wherein the grippers comprise at least one boss configured to mate with a corresponding reciprocal cavity of the sample tray.

6. The system of claim 1, wherein a second hand of the robot comprises a hand attachment mechanism configured to engage with a corresponding mounting hole of the sample tray, and wherein the hand attachment mechanism comprises a movable piston and a post engaged to the piston that is configured to engage with the corresponding mounting hole.

7. The system of claim 1, wherein the magnet is configured to mate with a metal plate disposed on the door of the piece of equipment.

8. The system of claim 1, wherein the body of the robot further comprises at least one mood light in communication with the processor, the at least one mood light configured to indicate a status of the robot.

9. The system of claim 1, wherein the base mating interface of the robot comprises a switchable electromagnet configured to mate and unmate with the base station.

10. An interactive laboratory robotic system, comprising:
(A) an interactive humanoid robot, comprising:
a head and a turret modularly engaged to the head, wherein the head and the turret are each independently rotatable;
at least one arm modularly engaged to the turret, the at least one arm comprising a hand configured to mate with and grasp an object;
a body modularly engaged to the turret and comprising a processor; and
a base modularly engaged to the body and comprising a drive train configured to move the robot, and a base mating interface configured to connect the robot to a base station; and
(B) an interactive shelf, comprising:
a plurality of receiving slots each configured to hold a sample tray, each of the plurality of receiving slots comprising a hinged flap and a unique slot identifier for uniquely identifying one of the plurality of receiving slots; and
a unique identifier for uniquely identifying the interactive shelf,
wherein the hand of the robot comprises a hand attachment mechanism, wherein the hand attachment mechanism comprises a movable piston and a post engaged to the piston that is configured to engage with a corresponding mounting hole of the sample tray.

11. The system of claim 10, wherein the interactive shelf further comprises a shelf attachment mechanism configured to enable the interactive shelf to be mounted within a piece of equipment.

12. The system of claim 10, wherein the hinged flap of each of the plurality of receiving slots of the interactive shelf has alignment indicia disposed thereupon, the alignment indicia configured to enable a camera of a robot to align the hand of the robot with one of the plurality of receiving slots.

13. The system of claim 10, wherein the hinged flap of each of the plurality of receiving slots of the interactive shelf is configured to be visible when the one of the plurality of receiving slots is empty, and is further configured to be hidden when the one of the plurality of receiving slots is full.

14. The system of claim 10, wherein each of the plurality of receiving slots of the interactive shelf is further configured to lock the sample tray in place.

15. An interactive laboratory robotic system, comprising:
(A) an interactive humanoid robot, comprising:
a head and a turret modularly engaged to the head, wherein the head and the turret are each independently rotatable;
at least one arm modularly engaged to the turret, the at least one arm comprising a hand configured to mate with and grasp an object;
a body modularly engaged to the turret and comprising a processor; and
a base modularly engaged to the body and comprising a drive train configured to move the robot, and a base mating interface configured to connect the robot to a base station; and
(B) a mobile cart, comprising:
a plurality of shelves;
a plurality of wheels disposed on the bottom of the mobile cart;
at least one attachment mechanism configured to mate with the robot, wherein the at least one attachment mechanism of the mobile cart comprises a switchable electromagnet configured to mate and unmate with the robot;
a power source; and
an electrical socket electrically connected to the power source and configured to connect with a corresponding robot electrical socket of the robot.

16. The system of claim 15, wherein the power source of the mobile cart is configured to be electrically connected to the robot to enable charging of a robot power source through the electrical socket and the robot electrical socket.

17. The system of claim 15, wherein the mobile cart further comprises a power switch configured to allow the mobile cart to be activated or deactivated.

18. An interactive laboratory robotic system, comprising:
(A) an interactive humanoid robot, comprising:
a head and a turret modularly engaged to the head, wherein the head and the turret are each independently rotatable;
at least one arm modularly engaged to the turret, the at least one arm comprising a hand configured to mate with and grasp an object;
a body modularly engaged to the turret and comprising a processor; and
a base modularly engaged to the body and comprising a drive train configured to move the robot, and a base mating interface configured to connect the robot to a base station; and
(B) an accessory unit, comprising:
an attachment mechanism configured to enable the accessory unit to be mounted to a door of a piece of equipment;
a front plate comprising:
a mating interface configured to mate with the hand of the robot and enable the hand of the robot to open and close the door of the piece of equipment; and alignment indicia configured to enable a camera of a robot to align the hand of the robot with the mating interface;
a hinge connecting the attachment mechanism and the front plate; and
at least one unique identifier for uniquely identifying the accessory unit,
wherein the hand of the robot comprises a hand attachment mechanism, wherein the hand attachment mechanism comprises a magnet that is configured to mate with the mating interface of the accessory unit.

19. The system of claim 18, wherein the alignment indicia of the front plate of the accessory unit comprises an optical sensor.

20. The system of claim 18, wherein the mating interface comprises a metal plate.

21. The system of claim 18, wherein the front plate is configured to rotate about the hinge to allow the hand of the robot to open and close the door of the piece of equipment.

* * * * *